US012174580B2

(12) United States Patent
Hashiguchi et al.

(10) Patent No.: US 12,174,580 B2
(45) Date of Patent: Dec. 24, 2024

(54) PROCESSING SYSTEM AND RELAY UNIT

(71) Applicant: SEIKO EPSON CORPORATION, Tokyo (JP)

(72) Inventors: Namiki Hashiguchi, Shiojiri (JP); Hiroshi Shiobara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/181,266

(22) Filed: Mar. 9, 2023

(65) Prior Publication Data

US 2023/0288864 A1 Sep. 14, 2023

(30) Foreign Application Priority Data

Mar. 11, 2022 (JP) ................................. 2022-037786

(51) Int. Cl.
*G03G 21/16* (2006.01)

(52) U.S. Cl.
CPC ..... *G03G 21/1647* (2013.01); *G03G 21/1619* (2013.01)

(58) Field of Classification Search
CPC ....................... G03G 21/1647; G03G 21/1619
See application file for complete search history.

(56) References Cited

U.S. PATENT DOCUMENTS 5,943,085 A 8/1999 Higashi et al.
6,712,003 B2 3/2004 Hashiguchi
9,042,745 B2 5/2015 Yoshida et al.
9,233,543 B2 1/2016 Hirasawa et al.
2003/0071874 A1 4/2003 Ishizawa et al.
2013/0334759 A1* 12/2013 Osaki ................. G03G 21/1638 271/3.14
2020/0354182 A1 11/2020 Fuchi et al.
2022/0075311 A1* 3/2022 Kobayashi ......... G03G 21/1619

FOREIGN PATENT DOCUMENTS

EP 1815994 8/2007
JP 2016-133635 A 7/2016
JP 2021-008365 A 1/2021

* cited by examiner

*Primary Examiner* — Sandra Brase
(74) *Attorney, Agent, or Firm* — WORKMAN NYDEGGER

(57) ABSTRACT

A processing system includes: a first unit and a second unit coupled to the first unit by a positioning mechanism. The positioning mechanism includes a positioner including a first insertion portion that is included in one of the first unit and the second unit and a first inserted portion that is included in the other of the first unit and the second unit and to which the first insertion portion is inserted to position the first unit and the second unit; and a positioning guide including a second insertion portion that is included in one of the first unit and the second unit and a second inserted portion that is included in the other of the first unit and the second unit and to which the second insertion portion is inserted to guide the first insertion portion to an insertable position into the first inserted portion.

20 Claims, 12 Drawing Sheets

PROCESSING SYSTEM AND RELAY UNIT

The present application is based on, and claims priority from JP Application Serial Number 2022-037786, filed Mar. 11, 2022, the disclosure of which is hereby incorporated by reference herein in its entirety.

BACKGROUND

1. Technical Field

The present disclosure relates to a processing system and a relay unit.

2. Related Art

JP-A-2016-133635 discloses a known technology relating to a recording system, which is an example of a processing system of this kind. JP-A-2016-133635 discloses an image forming system in which an image forming apparatus having an inner output portion is coupled to a post-processing device. The image forming system includes a relay device detachably attached to the inner output portion.

However, the relay device of the above-described known technology, which is detachably attached to the inner output portion, often requires alignment at a tucked-away position of the image forming apparatus. The alignment is difficult for a common positioning mechanism. Due to the difficult alignment, the relay device may collide with the image forming apparatus, resulting in damage.

SUMMARY

According to an aspect of the present disclosure, a processing system includes a first unit configured to perform a first process and a second unit configured to perform a second process and coupled to the first unit by a positioning mechanism. The positioning mechanism includes: a positioner including a first insertion portion that is included in one of the first unit and the second unit and a first inserted portion that is included in the other of the first unit and the second unit and to which the first insertion portion is inserted to position the first unit and the second unit; and a positioning guide including a second insertion portion that is included in one of the first unit and the second unit and a second inserted portion that is included in the other of the first unit and the second unit and to which the second insertion portion is inserted to guide the first insertion portion to an insertable position into the first inserted portion, and the insertion of the positioning guide precedes the insertion of the positioner.

A relay unit according to the present disclosure is coupled to a recording apparatus by a positioning mechanism at an inner output portion of the recording apparatus and includes an inlet portion configured to receive a medium recorded by the recording apparatus. The relay unit is configured to transport the medium to a post-processing device that performs predetermined post-processing on the medium. The positioning mechanism includes: a positioner including a first insertion portion that is included in one of the recording apparatus and the relay unit and a first inserted portion that is included in the other of the recording apparatus and the relay unit and to which the first insertion portion is inserted to position the recording apparatus and the relay unit; and a positioning guide including a second insertion portion that is included in one of the recording apparatus and the relay unit and a second inserted portion that is included in the other of the recording apparatus and the relay unit and to which the second insertion portion is inserted to guide the first insertion portion to an insertable position into the first inserted portion, and the insertion of the positioning guide precedes the insertion of the positioner.

DESCRIPTION OF EXEMPLARY EMBODIMENTS

Embodiments

Figure 1:
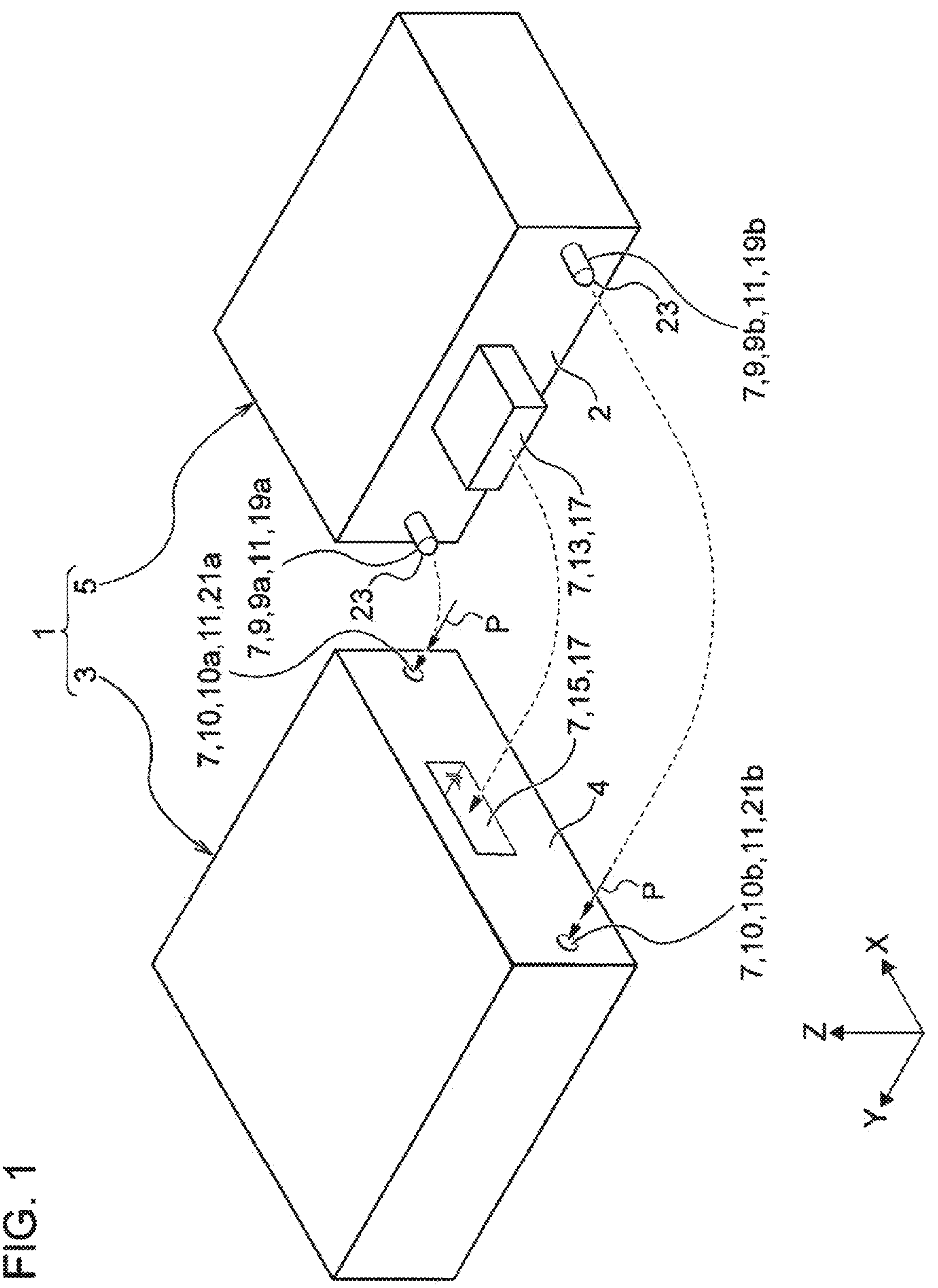
FIG. 1 is a schematic perspective view illustrating a processing system according to First Embodiment.
Figure 2A:
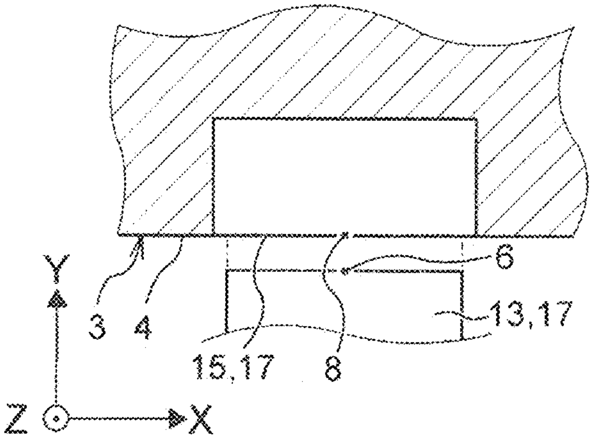
FIGS. 2A to 2F are schematic views illustrating operation of a positioning mechanism of First Embodiment.
Figure 2B:
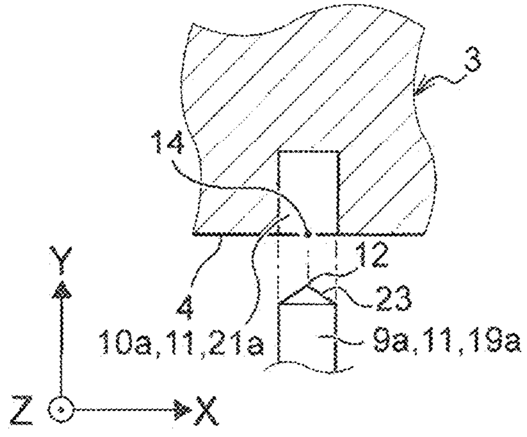
Figure 2C:
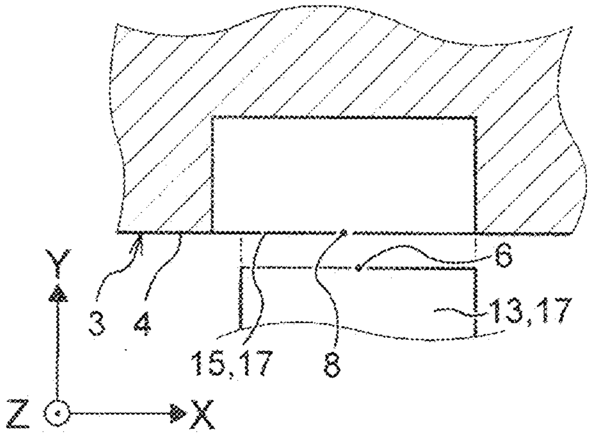
Figure 2D:
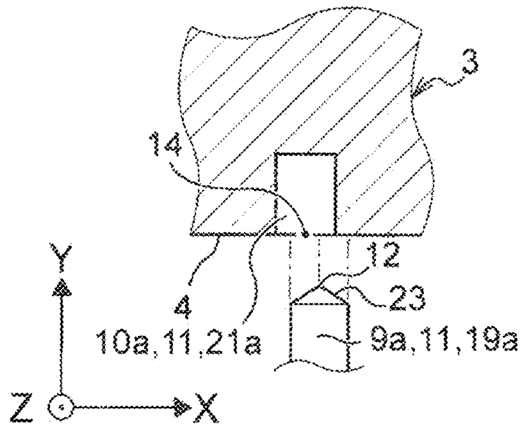
Figure 2E:
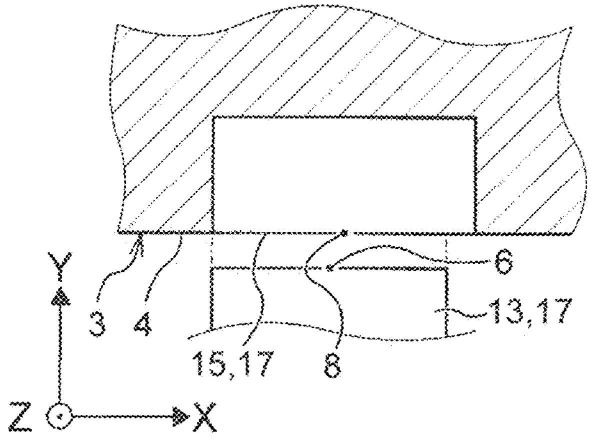
Figure 2F:
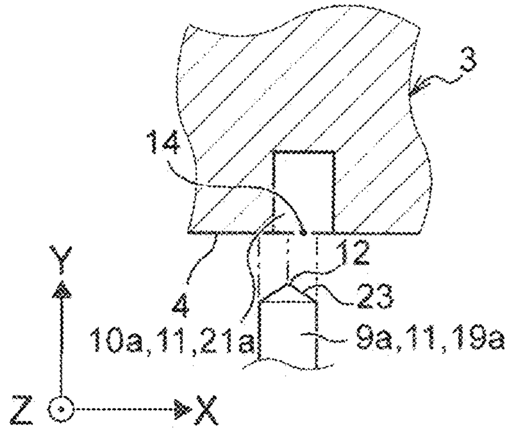

Hereinafter, an outline of the present disclosure will be described first. A processing system according to a first aspect of the present disclosure includes a first unit configured to perform a first process and a second unit configured to perform a second process and coupled to the first unit by a positioning mechanism. The positioning mechanism includes: a positioner including a first insertion portion that is included in one of the first unit and the second unit and a first inserted portion that is included in the other of the first unit and the second unit and to which the first insertion portion is inserted to position the first unit and the second unit; and a positioning guide including a second insertion portion that is included in one of the first unit and the second unit and a second inserted portion that is included in the other of the first unit and the second unit and to which the second insertion portion is inserted to guide the first insertion portion to an insertable position into the first inserted portion, and the insertion of the positioning guide precedes the insertion of the positioner.

Here, the "first process" means a main process performed by the first unit, such as a printing process on a medium if the first unit is a printer. The "second process" means a main process performed by the second unit, such as a stapling process on a medium if the second unit is a post-processing device that performs stapling. The "second process"

includes, for example, a "transport process" performed by a relay device that relays a medium sent from a printer to another processing device.

According to this aspect, when the first unit and the second unit are coupled to each other by the positioning mechanism, the insertion of the positioning guide precedes the insertion of the positioner. In this configuration, if the first unit and the second unit are moved close to each other with the positioning guide being misaligned, the second insertion portion, which constitutes the positioning guide, will collide with the other unit. However, the first insertion portion, which constitutes the positioner, will not collide with the other unit, because it has not reached the other unit. In other words, this configuration can reduce damage to the components of the positioner and the surrounding portions during the alignment. When the first unit and the second unit are moved close to each other with the alignment of the positioning guide being completed, the second insertion portion is inserted into the second inserted portion of the other unit. According to this aspect, the second insertion portion is inserted into the second inserted portion to guide the first insertion portion, which constitutes the positioner, to an insertable position into the first inserted portion. With this configuration, when the first unit and the second unit are further moved close to each other with the guided state being kept, the first insertion portion can be inserted into the first inserted portion.

As described above, according to this aspect, when the first stage of the alignment by the positioning guide is completed, the first insertion portion of the positioner is automatically positioned at an insertable position into the first inserted portion. In other words, the alignment of the positioner is completed when the first stage of the alignment is completed. With the alignment being completed, the first unit and the second unit are moved close to each other to allow the first insertion portion of the positioner to reach the entrance of the first inserted portion. This enables the first insertion portion to enter the first inserted portion with less risk of collision. Since the alignment is completed, the insertion of the first insertion portion of the positioner into the first inserted portion enables the first unit and the second unit to be coupled to each other in a correctly positioned state.

In the processing system according to a second aspect of the present disclosure, the positioning guide may have a clearance region in which the second insertion portion is movable relative to the second inserted portion in a direction intersecting a direction of the insertion, and the first insertion portion becomes insertable into the first inserted portion when the second insertion portion is positioned in the second inserted portion having the clearance region.

According to this aspect, the positioning guide has the clearance region in which the second insertion portion can move relative to the second inserted portion in a direction intersecting the insertion direction. The clearance region allows easier alignment for the second insertion portion to be inserted into the second inserted portion. The first insertion portion is insertable into the first inserted portion when the second insertion portion is positioned in the second inserted portion having the clearance region. With this configuration, when the first insertion portion is inserted into the first inserted portion, the first unit and the second unit are coupled to each other in a correctly positioned state.

In the processing system according to a third aspect of the present disclosure, the clearance region may include a vertical clearance section that defines a vertical movable range and a horizontal clearance section that defines a horizontal movable range.

According to this aspect, the clearance region has the vertical clearance section and the horizontal clearance section. This enables the user to perform the alignment of the positioning guide in the area of the vertical clearance section and the horizontal clearance section, resulting in easier alignment of the positioning guide.

In the processing system according to a fourth aspect of the present disclosure, the first insertion portion may include a pin protruding in the insertion direction, the first inserted portion may include a hole, the pin may have a tapered portion tapered in the insertion direction at a front end, and the tapered portion may have a tip in the hole when the second insertion portion is positioned in the clearance region of the second inserted portion.

According to this aspect, when the second insertion portion is positioned in the clearance region of the second inserted portion, the pin, which is the first insertion portion having the tapered portion at the front end, has the tip in the hole, which is the first inserted portion. This configuration does not require that the axes of the first insertion portion and the first inserted portion are aligned and only requires that the tip of the tapered portion is in the hole. When the insertion continues in that state, the tapered portion leads the axes to be aligned. Thus, this simple structure can provide the configuration in which the first insertion portion becomes insertable into the first inserted portion when the second insertion portion is positioned in the clearance region of the second inserted portion.

In the processing system according to a fifth aspect of the present disclosure, the first insertion portion may include a pin protruding in the insertion direction, the first inserted portion may include a hole, the hole may have a reverse tapered portion having a diameter that gradually increases in a direction opposite the insertion direction at a hole entrance, and the pin may be positioned in a largest diameter portion of the hole when the second insertion portion is positioned in the clearance region of the second inserted portion.

According to this aspect, when the second insertion portion is in the clearance region of the second inserted portion, the pin is in the largest diameter portion of the reverse tapered portion of the hole. This configuration does not require that the axes of the first insertion portion and the first inserted portion are aligned and only requires that the pin is in the largest diameter portion of the reverse tapered portion of the hole. When the insertion continues in that state, the reverse tapered portion leads the axes to be aligned. Thus, this simple structure can provide the configuration in which the first insertion portion becomes insertable into the first inserted portion when the second insertion portion is positioned in the clearance region of the second inserted portion.

In the processing system according to a sixth aspect of the present disclosure, the first unit may be a recording apparatus having an inner output portion to which a recorded medium is discharged, the second unit may be an optional unit coupled to the recording apparatus by the positioning mechanism at the inner output portion and having an inlet portion that receives a medium recorded by the recording apparatus, the positioner may include two positioners that are located with the inlet portion being therebetween in a width direction of the medium to be discharged, and the positioning guide may be located above the inlet portion.

When the second unit is an optional unit that is coupled to the recording apparatus by the positioning mechanism at the inner output portion of the recording apparatus to receive the medium recorded by the recording apparatus, the positioner is positioned at a less visible position to the user. In particular, when the positioners are located with the inlet portion being therebetween in the width direction of a medium to be transported, it is difficult for a person to work while checking both the positioners at the same time, and the positioners are less visible. This makes the alignment of the positioners difficult. However, according to this aspect, as described above, the alignment of the positioner is completed when the first stage of the alignment by the positioning guide is completed, and thus the first insertion portion can enter the first inserted portion with less risk of collision. Furthermore, the positioning guide is located above the inlet portion, and thus the visibility of the positioning guide, which performs the first stage of alignment, increases. The alignment of the positioning guide is easier by a level corresponding to the increased visibility. Thus, the recording apparatus and the optional unit are coupled to each other in a correctly positioned state.

In the processing system according to a seventh aspect of the present disclosure, the positioning guide may be located above the positioner.

According to this aspect, the positioning guide is located above the positioner, and thus the positioning guide is more visible during the alignment, resulting in easier alignment of the positioning guide.

In the processing system according to an eighth aspect of the present disclosure, the positioning guide may be located upstream of the positioner in the insertion direction.

According to this aspect, the positioning guide is located upstream of the positioner in the insertion direction, and thus the positioning guide is more visible during the alignment, resulting in easier alignment of the positioning guide.

In the processing system according to a ninth aspect of the present disclosure, the recording apparatus may include a discharge portion configured to discharge a recorded medium, and the discharge portion may be inserted into the inlet portion.

In the processing system in which the discharge portion of the recording apparatus is inserted into the inlet portion of the optional unit, if the discharge portion and the inlet portion are moved close to each other with the alignment being insufficient, there is a risk of damage to the positioning mechanism as well as a risk of damage to the discharge portion and the inlet portion caused by collision between them. It can be said that the present disclosure is greatly beneficial to the processing system having such a structure.

In the processing system according to a tenth aspect of the present disclosure, the first inserted portion may be located on the same plane as the discharge portion.

In the processing system in which the inlet portion of the optional unit receives the medium discharged from the discharge portion of the recording apparatus, the relative positions of the discharge portion and the inlet portion particularly require a high level of positioning accuracy. According to this aspect, the first inserted portion is located on the same plane as the discharge portion. This enables the positioner to be positioned close to the discharge portion, and thus the requirement can be readily satisfied.

In the processing system according to an eleventh aspect of the present disclosure, the second inserted portion may include a first hole that is included in one of the recording apparatus and the optional unit, the second insertion portion may include a first projection that is included in one of the recording apparatus and the optional unit and inserted into the first hole, and vertical movement of the optional unit is limited when the first projection is inserted into the first hole.

According to this aspect, the vertical movement of the optional unit is limited when the first projection, which constitutes the positioning guide, is inserted into the first hole, which also constitutes the positioning guide. In other words, according to this aspect, when the first projection is inserted into the first hole, the movable range of the first projection is limited by the upper end and the lower end of the hole. Thus, the formation of the vertical clearance region is easy.

In the processing system according to a twelfth aspect of the present disclosure, the second inserted portion may have a first flat portion, the first flat portion may have a flat surface extending in the insertion direction and may face a lower surface of the first projection to be inserted, and the first flat portion may limit a downward movement of the first projection inserted into the first hole.

According to this aspect, the downward movement of the first projection inserted into the first hole is limited by the first flat portion, resulting in easier alignment of the positioning guide. Furthermore, the first projection inserted into the first hole is guided in the insertion direction by the first flat portion, also resulting in easier alignment of the positioning guide.

The processing system according to a thirteenth aspect of the present disclosure may further include two second projections located with the first hole being therebetween in a width direction of the medium and two second holes to which the second projections are inserted. When the second projections are inserted into the second holes, rotation of the optional unit about the second insertion portions is limited.

According to this aspect, the rotation of the optional unit about the second insertion portion is limited when the second projections are inserted into the respective second holes. This enables the alignment of the positioning guide to be performed in a stable posture, resulting in easier alignment of the positioning guide.

In the processing system according to a fourteenth aspect of the present disclosure, the second projections may be additional second insertion portions of the positioning guide, and the second holes may be additional second inserted portions of the positioning guide, and when the second projections are inserted into the second holes, upward movement of the optional unit is limited.

According to this aspect, the upward movement of the optional unit is limited when the second projections, which constitute the additional second insertion portions, are inserted into the second holes, which constitute the additional second inserted portions, resulting in easier alignment of the positioning guide.

In the processing system according to a fifteenth aspect of the present disclosure, the additional second inserted portions may have second flat portions, the second projections may be third flat portions having a plate-like shape, and when the third flat portions are inserted into the respective second holes, the second flat portions may overlap the third flat portions from below.

According to this aspect, when the third flat portions are inserted into the respective second holes, the second flat portions overlap the third flat portions from below. This limits the upward movement and enables the alignment of the positioning guide to be performed in a stable posture, resulting in easier alignment of the positioning guide. Furthermore, since the second flat portion overlaps the third flat portion from below, the second flat portion and the third flat portion can be fixed to each other with a fastener, such as a screw. This fixing operation is easy, since the positioning guide is located above the inlet portion.

In the processing system according to a sixteenth aspect of the present disclosure, the optional unit may be a relay unit configured to transport the medium recorded by the recording apparatus to a post-processing device configured to perform predetermined post-processing on the recorded medium.

According to this aspect, the relay unit having such a configuration can have the same effect as the sixth aspect.

In the processing system according to a seventeenth aspect of the present disclosure, the relay unit may have a rear portion having a delivery portion that delivers the medium to the post-processing device. The recording apparatus may include a restriction portion that limits movement of the relay unit in the insertion direction, and the restriction portion may limit the movement of the rear portion in the insertion direction.

According to this aspect, when the relay unit positioned at the inner output portion of the recording apparatus is moved in the insertion direction to be positioned by the positioning mechanism for mounting, the movement of the rear portion in the insertion direction is limited by the restriction portion. Thus, the mounting operation is easy.

A relay unit according to an eighteenth aspect of the present disclosure is coupled to a recording apparatus by a positioning system at an inner output portion of the recording apparatus and including an inlet portion configured to receive a medium recorded by the recording apparatus. The relay unit is configured to transport the medium to a post-processing device that performs predetermined post-processing on the medium. The positioning mechanism includes: a positioner including a first insertion portion that is included in one of the recording apparatus and the relay unit and a first inserted portion that is included in the other of the recording apparatus and the relay unit and to which the first insertion portion is inserted to position the recording apparatus and the relay unit; and a positioning guide including a second insertion portion that is included in one of the recording apparatus and the relay unit and a second inserted portion that is included in the other of the recording apparatus and the relay unit and to which the second insertion portion is inserted to guide the first insertion portion to an insertable position into the first inserted portion, and thus the insertion of the positioning guide precedes the insertion of the positioner.

According to this aspect, the relay unit can have the same effect as the first aspect.

In the relay unit according a nineteenth aspect of the present disclosure, the positioner may include two positioners located with the inlet portion being therebetween in a width direction of a medium to be discharged, and the positioning guide may be located above the inlet portion.

According to this aspect, the relay unit can have the same effect as the sixth aspect.

The relay unit according to a twentieth aspect of the present disclosure may further include two additional positioning guides located with the positioning guide being therebetween in the width direction of the medium. When second projections as second insertion portions of the additional positioning guides are inserted into second holes as second inserted portions of the additional positioning guides, rotation of the optional unit about the positioning guide that is located between the additional positioning guides is limited.

According to this aspect, the relay unit can have the same effect as the thirteenth aspect.

First Embodiment

Hereinafter, a processing system 1 according to First Embodiment of the present disclosure will be described with reference to FIGS. 1 to 4. In the following description, the three mutually orthogonal axes are the X, Y, and Z axes as indicated in each figure. The Z-axis direction corresponds to the vertical direction, i.e., the direction of gravity. The X-axis direction and the Y-axis direction correspond to the horizontal direction. In each figure, the three axes (X, Y, Z) each indicate a positive direction with the head of the arrow and a negative direction with the tail of the arrow.

As illustrated in FIGS. 1 to 4, the processing system 1 of this embodiment includes a first unit 3 configured to perform a first process and a second unit 5 configured to perform a second process. The first unit 3 and the second unit 5 included in the processing system 1 are positioned by a positioning mechanism 7 and coupled to each other. In this embodiment, the positioning mechanism 7 includes a positioner 11 in which a first insertion portion 9 included in a joint surface 2 of the second unit 5 is inserted into a first inserted portion 10 included in a joint surface 4 of the first unit 3 to position the first unit 3 and the second unit 5. Furthermore, the positioning mechanism 7 includes a positioning guide 17 in which a second insertion portion 13 included in the joint surface 2 of the second unit 5 is inserted into a second inserted portion 15 included in the joint surface 4 of the first unit 3 to guide the first insertion portion 9 to an insertable position into the first inserted portion 10. On the contrary, the joint surface 2 of the second unit 5 may have the first inserted portion 10, the joint surface 4 of the first unit 3 may have the first insertion portion 9, the joint surface 2 of the second unit 5 may have the second inserted portion 15, and the joint surface 4 of the first unit 3 may have the second insertion portion 13.

The relative positions of the positioning guide 17 and the positioner 11 are determined such that the insertion of the positioning guide 17, i.e., the insertion of the second insertion portion 13 into the second inserted portion 15, precedes the insertion of the positioner 11, i.e., the insertion of the first insertion portion 9 into the first inserted portion 10. The term "precedes" means that the first insertion portion 9 of the positioner 11 has not reached the entrance of the first inserted portion 10 when the second insertion portion 13 of the positioning guide 17 that approached the second inserted portion 15 starts the insertion. In other words, the first insertion portion 9 of the positioner 11 reaches the entrance of the first inserted portion 10 and starts the insertion after the second insertion portion 13 that approached the second inserted portion 15 reached the entrance and started the insertion. In simple terms, in a configuration in which the first insertion portion 9 and the second insertion portion 13 protrude from the same joint surface 2 as illustrated in FIG. 1, the second insertion portion 13 protrudes more from the joint surface 2 in the insertion direction P than the first insertion portion 9.

Positioner

The positioner 11 is configured such that the first insertion portion 9 is inserted into the first inserted portion 10 to position the first unit 3 and the second unit 5 at intended relative positions and couples the first unit 3 and the second unit 5 at the intended relative positions to each other. Here, as illustrated in FIG. 1, the first insertion portion 9 includes two first insertion portions 9*a* and 9*b*, and the first inserted portion 10 includes two first inserted portions 10*a* and 10*b*. The positioner 11 may include three or more first insertion portions 9 and the same number of first inserted portions 10.

Alternatively, the positioner 11 may include one first insertion portion 9 and one first inserted portion 10. In such a case, the second unit 5 may be rotated about the one positioner 11, and thus the alignment is difficult. It is preferable that the rotation be restricted for positioning. For example, the first insertion portion 9 may have a polygonal plate-like shape, and the first inserted portion 10 may be a rectangular hole having a shape corresponding to the polygonal plate-like shape to restrict the rotation.

In this embodiment, the first insertion portions 9*a* and 9*b* of the positioner 11 are pins 19*a* and 19*b* protruding in the insertion direction P (+Y direction). Here, the pins 19*a* and 19*b* are cylindrical. The first inserted portions 10*a* and 10*b* are holes 21*a* and 21*b* that receive the pins 19*a* and 19*b*. The inner shape of the holes 21*a* and 21*b* corresponds to the cylindrical shape of the pins 19*a* and 19*b*. In other words, the outer diameter of the pins 19*a* and 19*b* and the hole diameter of the holes 21*a* and 21*b* are substantially the same. The pins 19*a* and 19*b* and the holes 21*a* and 21*b* are in contact with each other with an enough clearance for the insertion. Furthermore, as illustrated in FIGS. 2B, 2D, and 2F and FIGS. 3B, 3D, and 3F, the pins 19*a* and 19*b* each have a tapered portion 23, which tapers in the insertion direction P, at the front end. The tapered portions 23 allow the pins 19*a* and 19*b* to be more readily inserted into the holes 21*a* and 21*b*. Here, the tapered portion 23 is conical. The tapered portion 23 may have a conical trapezoidal shape or any other shape that allows easier insertion.

Positioning Guide

Figure 3A:
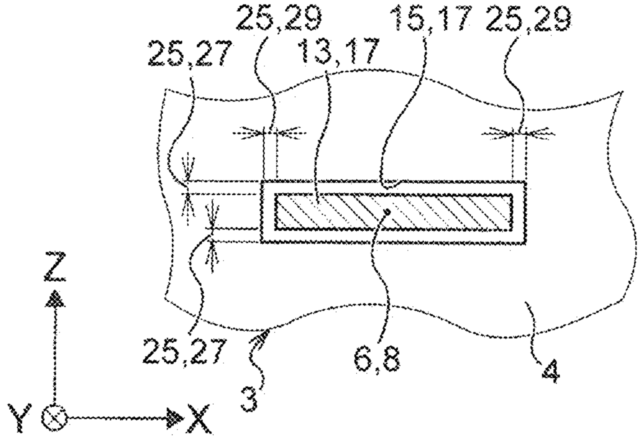
FIGS. 3A to 3F are schematic views illustrating operation of the positioning mechanism of First Embodiment.
Figure 3B:
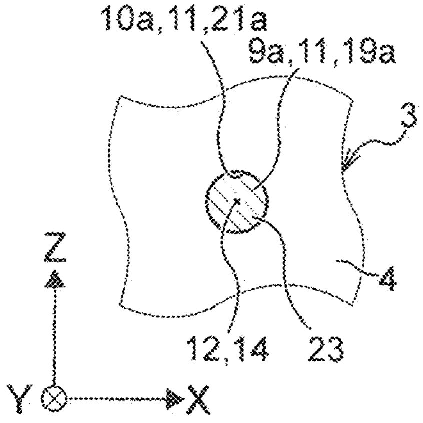
Figure 3C:
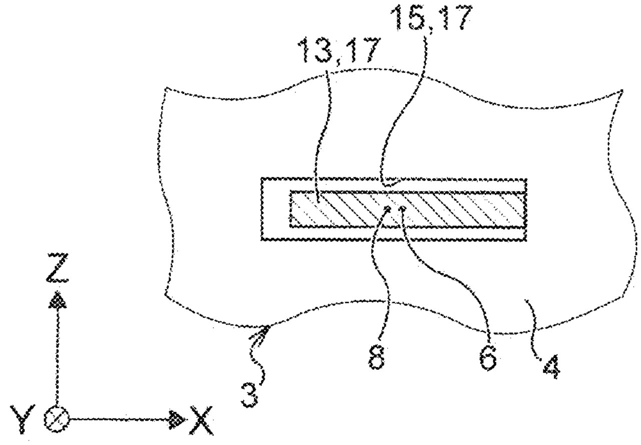
Figure 3D:
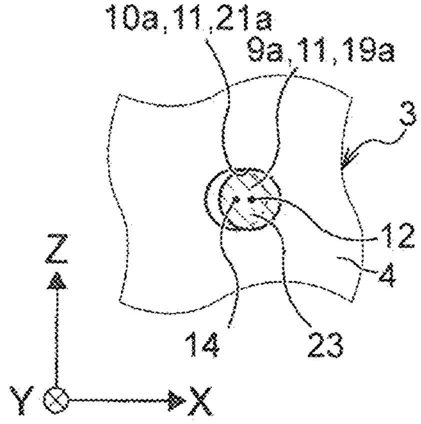
Figure 3E:
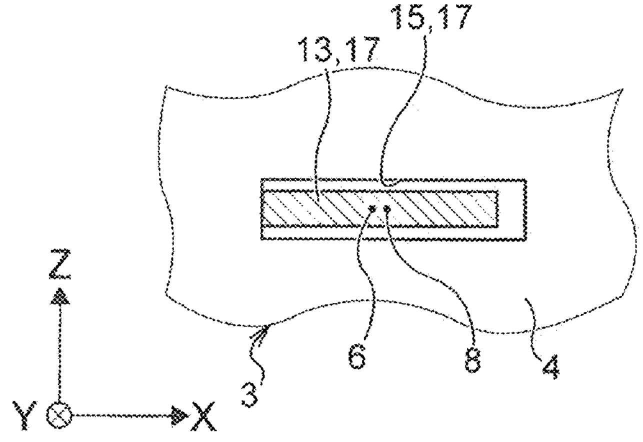
Figure 3F:
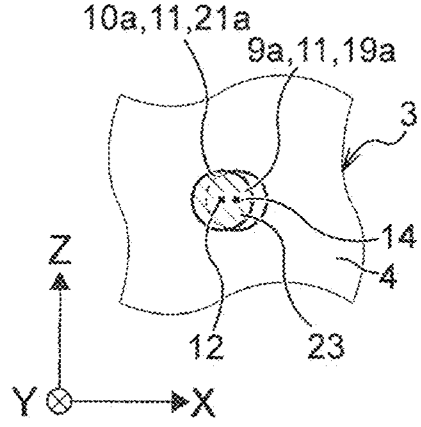

The positioning guide 17 is configured to guide the first insertion portion 9 (9*a*, 9*b*) to an insertable position into the first inserted portion 10 (10*a*, 10*b*) when the second insertion portion 13 is inserted into the second inserted portion 15. Here, as illustrated in FIG. 1, the second insertion portion 13 has a polygonal plate shape. The second inserted portion 15 has an inner shape corresponding to the polygonal plate shape. In this embodiment, as illustrated in FIG. 3A, the positioning guide 17 has a clearance region 25 in which the second insertion portion 13 can be moved relative to the second inserted portion 15 in the X-axis direction and the Z-axis direction, which intersect the insertion direction P. In this embodiment, the clearance region 25 includes a vertical clearance section 27 that defines the movable range in the vertical direction (Z-axis direction) and a horizontal clearance section 29 that defines the movable range in the horizontal direction (X-axis direction). Here, the vertical clearance section 27 and the horizontal clearance section 29 have the same dimensions. As described above, the clearance region 25 is a gap between the outer surface of the second insertion portion 13 and the inner surface of the second inserted portion 15 with the second insertion portion 13 being inserted into the second inserted portion 15. The first insertion portion 9 (9*a*, 9*b*) becomes insertable into the first inserted portion 10 (10*a*, 10*b*) when the second insertion portion 13 is positioned in the second inserted portion 15 having the clearance region 25.

With reference to FIGS. 2A to 2F and 3A to 3F, the structure will be described in which the first insertion portion 9 (9*a*, 9*b*) of the positioner 11 is guided to an insertable position into the first inserted portion 10 (10*a*, 10*b*) when the second insertion portion 13 of the positioning guide 17 is positioned in the second inserted portion 15 having the clearance region 25. Here, the positioner 11 located away from the positioning guide 17 in the +X direction is used as an example, but the same applies to the positioner 11 located away from the positioning guide 17 in the −X direction, although the X direction is oppositely oriented. FIGS. 2A and 2B and FIGS. 3A and 3B illustrate a state in which the center 6 of the front end of the second insertion portion 13 is aligned with the center 8 of the second inserted portion 15 in the insertion direction P. In this state, the center 12 of the front end of the pin 19*a*, 19*b*, which is the first insertion portion 9 (9*a*, 9*b*), is aligned with the center 14 of the hole 21*a*, 21*b*, which is the first inserted portion 10 (10*a*, 10*b*), in the insertion direction P. That is, the first insertion portion 9 (9*a*, 9*b*) is positioned at an insertable position into the first inserted portion 10 (10*a*, 10*b*).

FIGS. 2C and 2D and FIGS. 3C and 3D illustrate a state in which the center 6 of the front end of the second insertion portion 13 is not aligned with the center 8 of the second inserted portion 15 in the insertion direction P and is displaced maximally in the +X direction in the clearance region 25. In this state, the center 12 of the front end of the pin 19*a*, 19*b*, which is the first insertion portion 9 (9*a*, 9*b*), is displaced in the +X direction from the center 14 of the hole 21*a*, 21*b*, which is the first inserted portion 10 (10*a*, 10*b*). However, the relative positions of the positioning guide 17 and the positioner 11 are determined such that the center 12 of the front end of the pin 19*a*, 19*b* is positioned in the hole 21*a*, 21*b* even with the above-described displacement in the +X direction. With this configuration, when the pin 19*a*, 19*b* is moved toward the hole 21*a*, 21*b*, the tapered portion 23 first comes in contact with the entrance edge of the hole 21*a*, 21*b*. Then, the pin 19*a*, 19*b* is guided by the tapered portion 23 in the direction (−X direction) that allows the center 12 of the pin 19*a*, 19*b* to be aligned with the center 14 of the hole 21*a*, 21*b*. When the centers 12 and 14 are aligned, the pin 19*a*, 19*b* is inserted into the hole 21*a*, 21*b*. In other words, even when the positioning guide 17 is displaced maximally in the +X direction in the clearance region 25 as described above, the first insertion portion 9 (9*a*, 9*b*) of the positioner 11 is positioned at an insertable position into the first inserted portion 10 (10*a*, 10*b*).

FIGS. 2E and 2F and FIGS. 3E and 3F illustrate a state in which the center 6 of the front end of the second insertion portion 13 is not aligned with the center 8 of the second inserted portion 15 in the insertion direction P and is displaced maximally in the −X direction in the clearance region 25. In this state, the center 12 of the front end of the pin 19*a*, 19*b* is displaced from the center 14 of the hole 21*a*, 21*b* in the −X direction. However, the relative positions of the positioning guide 17 and the positioner 11 are determined such that the center 12 of the front end of the pin 19*a*, 19*b* is positioned in the hole 21*a*, 21*b* even with the above-described displacement in the −X direction. With this configuration, when the pin 19*a*, 19*b* is moved toward the hole 21*a*, 21*b*, the tapered portion 23 first comes in contact with the entrance edge of the hole 21*a*, 21*b*. Then, the pin 19*a*, 19*b* is guided by the tapered portion 23 in the direction (+X direction) that allows the center 12 of the pin 19*a*, 19*b* to be aligned with the center 14 of the hole 21*a*, 21*b*. Then, when the centers 12 and 14 are aligned, the pin 19*a*, 19*b* is inserted into the hole 21*a*, 21*b*. In other words, even when the positioning guide 17 is maximally displaced in the −X direction in the clearance region 25 as described above, the first insertion portion 9 (9*a*, 9*b*) of the positioner 11 is positioned at an insertable position into the first inserted portion 10 (10*a*, 10*b*).

When the center 6 of the front end of the second insertion portion 13 is not aligned with the center 8 of the second inserted portion 15 in the insertion direction P and is displaced maximally in the +Z direction or the −Z direction in the clearance region 25, the first insertion portion 9 (9*a*, 9*b*) is positioned at an insertable position into the first inserted portion 10 (10*a*, 10*b*). This can be explained by the above explanation with reference to FIGS. 2A to 2F and FIGS. 3A to 3F, if "X direction" is replaced with "Z direction". Thus, this will not be described.

First Modification

In the above description, the clearance region 25 includes the vertical clearance section 27 and the horizontal clearance section 29 that have the same dimensions. However, the present disclosure should not be limited to the structure having the "same dimensions". One may be larger than the other. One or both of the dimensions of the vertical clearance section 27 and the horizontal clearance section 29 may be almost zero. This makes the alignment of the positioning guide 17 difficult and increases the possibility that the second insertion portion 13 will collide with the joint surface 4 having the second inserted portion 15. However, the positioning guide 17 is not configured to position the first unit 3 and the second unit 5 but is configured to guide the first insertion portion 9 of the positioner 11 to an insertable position into the first inserted portion 10. Thus, even if the second insertion portion 13 of the positioning guide 17 collides with the joint surface 4, it poses little problem for the structure of the processing system 1 without collision of the positioner 11. In the processing system 1 having such a configuration, the second insertion portion 13 may be tapered at the front end to enable easy insertion into the second inserted portion 15.

Second Modification

Figure 4:
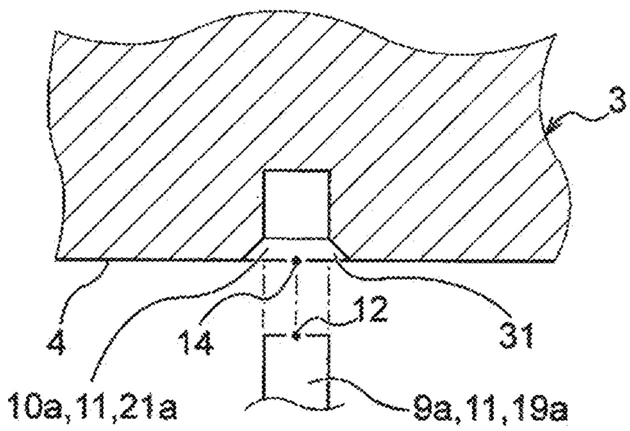
FIG. 4 is a schematic view illustrating operation of a modification of First Embodiment.

Instead of the tapered portion 23 at the front end of the first insertion portion 9, as illustrated in FIG. 4, the hole 21*a*, 21*b* may have a reverse tapered portion 31 having a diameter that gradually increases in the insertion direction P (−Y direction) at the hole entrance. The pin 19*a*, 19*b* does not have a tapered portion 23 at the front end. The pin 19*a*, 19*b* may have a tapered portion 23 at the front end. The pin 19*a*, 19*b* of the positioner 11 is configured to be positioned in the largest diameter portion of the reverse tapered portion 31 of the hole 21*a*, 21*b* when the second insertion portion 13 is positioned in the clearance region 25 of the second inserted portion 15. This may be used in combination with the tapered portion 23 at the front end of the first insertion portion 9.

Explanation of Effects of First Embodiment (1) The following problems are found in a structure in which one apparatus has an insertion pin and another apparatus has a receiving hole or the like, and the apparatuses are positioned and coupled by insertion of the insertion pin into the receiving hole. If the insertion pin and the receiving hole that are displaced due to insufficient alignment, are moved close to each other, the insertion pin may collide the other apparatus. This may damage the insertion pin and further damage the other apparatus. In particular, if the device having the insertion pin is large, the insertion pin is far away from the user, resulting in difficult alignment. Thus, the collision is highly likely to occur.

According to this embodiment, when the first unit 3 and the second unit 5 are coupled to each other by the positioning mechanism 7, the insertion of the positioning guide 17 precedes the insertion of the positioner 11. In this configuration, if the first unit 3 and second unit 5 are moved close to each other with the positioning guide 17 being misaligned, the second insertion portion 13, which constitutes the positioning guide 17, will collide with the other unit 3. However, the first insertion portion 9, which constitutes the positioner 11, will not collide with the other unit 3, because it has not reached the other unit 3. In other words, this configuration can reduce damage to the components of the positioner 11 and the surrounding portions during the alignment. When the first unit 3 and the second unit 5 are moved close to each other with the alignment of the positioning guide 17 being completed, the second insertion portion 13 is inserted into the second inserted portion 15 of the other unit 3. According to this embodiment, the second insertion portion 13 is inserted into the second inserted portion 15 to guide the first insertion portion 9, which constitutes the positioner 11, to an insertable position into the first inserted portion 10. With this configuration, when the first unit 3 and the second unit 5 are further moved close to each other with the guided state being kept, the first insertion portion 9 can be inserted into the first inserted portion 10.

As described above, according to this embodiment, when the first stage of the alignment by the positioning guide 17 is completed, the first insertion portion 9 of the positioner 11 is automatically positioned at an insertable position into the first inserted portion 10. In other words, the alignment of the positioner 11 is completed when the above-described first stage of the alignment is completed. With the alignment being completed, the first unit 3 and the second unit 5 are moved close to each other to allow the first insertion portion 9 of the positioner 11 to reach the entrance of the first inserted portion 10. This enables the first insertion portion 9 to enter the first inserted portion 10 with less risk of collision. Since the alignment is completed, the insertion of the first insertion portion 9 of the positioner 11 into the first inserted portion 10 enables the first unit 3 and the second unit 5 to be coupled to each other in a correctly positioned state.

(2) According to this embodiment, the positioning guide 17 has the clearance region 25 in which the second insertion portion 13 can move relative to the second inserted portion 15 in a direction intersecting the insertion direction P. The clearance region 25 allows easier alignment for the second insertion portion 13 to be inserted into the second inserted portion 15. The first insertion portion 9 is insertable into the first inserted portion 10 when the second insertion portion 13 is positioned in the second inserted portion 15 having the clearance region 25. With this configuration, when the first insertion portion 9 is inserted into the first inserted portion 10, the first unit 3 and the second unit 5 are coupled to each other in a correctly positioned state.

(3) According to this embodiment, the clearance region 25 has the vertical clearance section 27 and the horizontal clearance section 29. This enables the user to perform the alignment of the positioning guide 17 in the area of the vertical clearance section 27 and the horizontal clearance section 29, resulting in easier alignment of the positioning guide 17.

(4) According to this embodiment, when the second insertion portion 13 is positioned in the clearance region 25 of the second inserted portion 15, the pin 19*a*, 19*b*, which is the first insertion portion 9 having the tapered portion 23 at the front end, has the tip in the hole 21*a*, 21*b*, which is the first inserted portion 10. This configuration does not require that the axes of the first insertion portion 9 and the first inserted portion 10 are aligned and only requires that the center 12 at the tip of the tapered portion 23, is in the hole 21*a*, 21*b*. When the insertion continues in that state, the tapered portion 23 leads the axes to be aligned. Thus, this simple structure can provide the configuration in which the first insertion portion 9 becomes insertable into the first inserted portion 10 when the second insertion portion 13 is positioned in the clearance region 25 of the second inserted portion 15.

(5) Furthermore, according to this embodiment, when the second insertion portion 13 is in the clearance region 25 of the second inserted portion 15, the pin 19*a*, 19*b* is in the largest diameter portion of the reverse tapered portion 31 of the hole 21*a*, 21*b*. This configuration does not require that the axes of the first insertion portion 9 and the first inserted portion 10 are aligned and only requires that the pin 19*a*, 19*b* is in the largest diameter portion of the reverse tapered portion 31 of the hole 21*a*, 21*b*. When the insertion continues in that state, the reverse tapered portion 31 leads the axes to be aligned. Thus, this simple structure can provide the configuration in which the first insertion portion 9 becomes insertable into the first inserted portion 10 when the second insertion portion 13 is positioned in the clearance region 25 of the second inserted portion 15.

Second Embodiment

Figure 5:
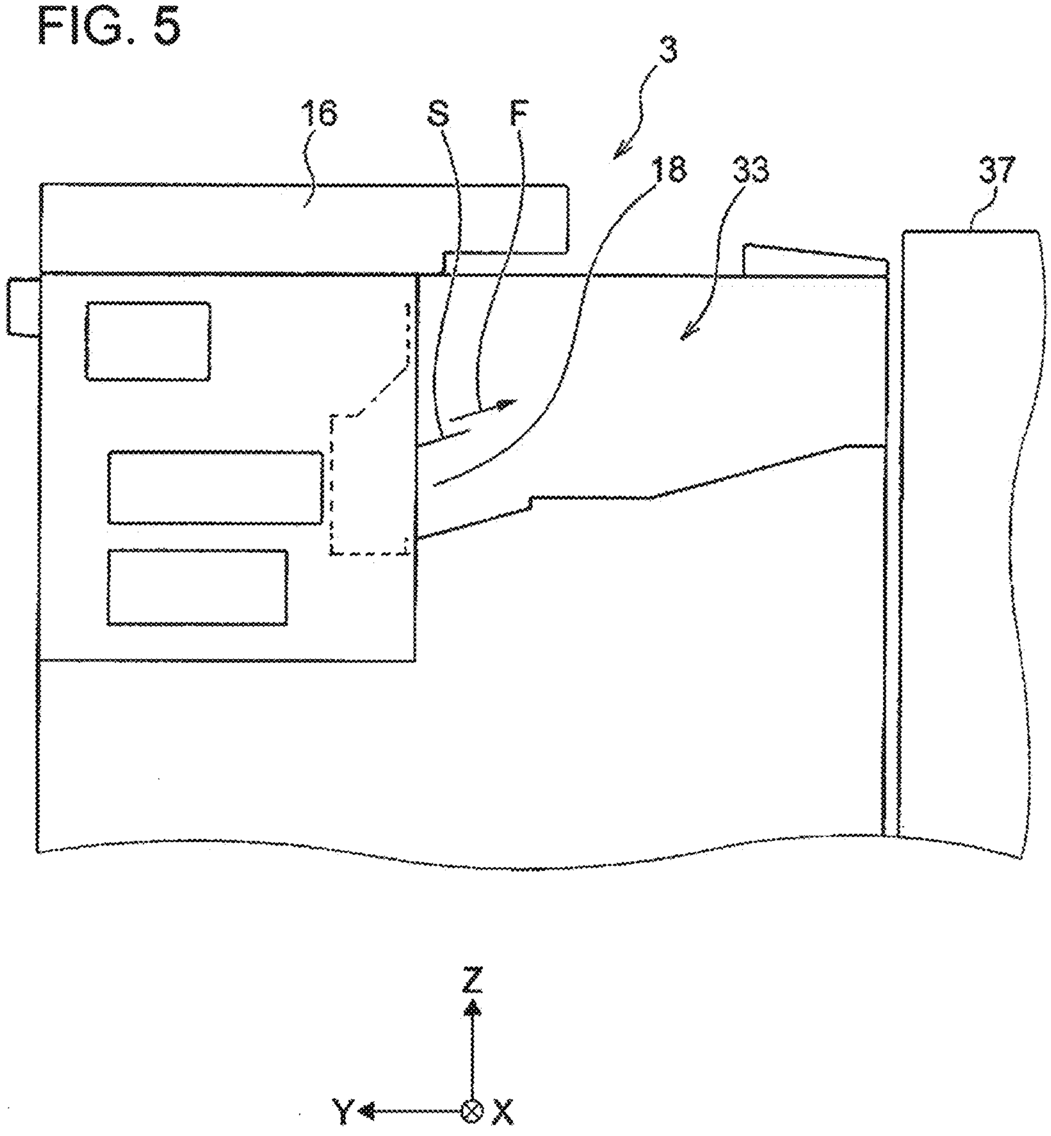
FIG. 5 is a schematic front view illustrating main components of a processing system of Second Embodiment.

Hereinafter, a processing system 1 according to Second Embodiment of the present disclosure will be described with reference to FIGS. 5 to 13. The same reference numerals are assigned to the same components as those in First Embodiment without duplicated explanation. In this embodiment, as illustrated in FIG. 5, the first unit 3 is a recording apparatus 3 that has an inner output portion 33 to which the medium S, such as a recorded sheet, is discharged. The recording apparatus 3 and the first unit 3 are designated by the same reference numeral. The recording apparatus 3 is an ink jet printer and has a scanner 16 at the top. The top of the inner output portion 33 is at least partially covered by the scanner 16, and the side thereof is partially or fully covered by a side plate or the like. In this configuration, when the second unit 5 is coupled to a tucked-away portion 18 of the inner output portion 33, the visibility is low, often resulting in difficult alignment of the positioning mechanism 11.

Figure 6:
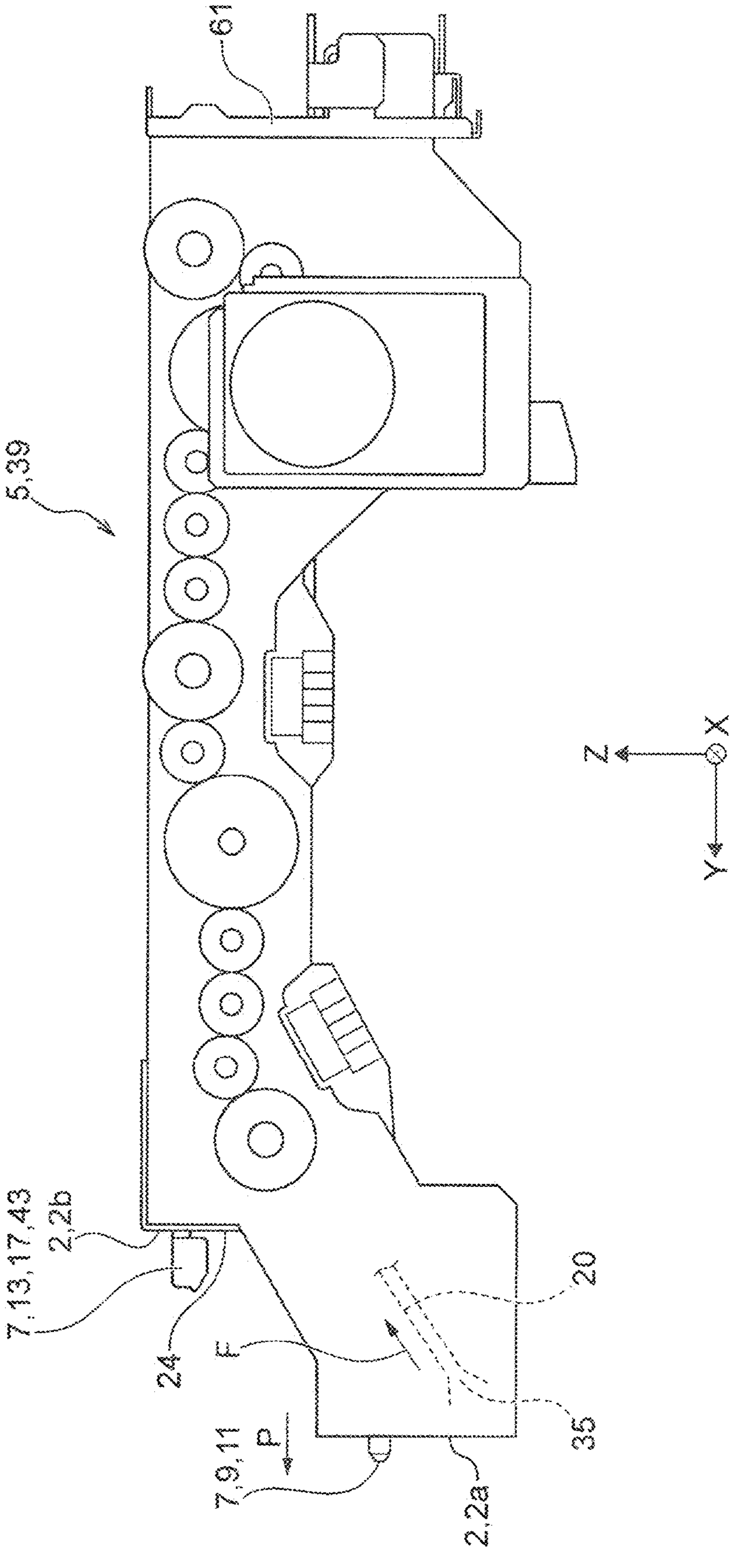
FIG. 6 is a front view illustrating a relay unit of Second Embodiment.

In this embodiment, the second unit 5 is an optional unit 5 that is coupled to the recording apparatus 3 at the tucked-away portion 18 of the inner output portion 33 by the positioning mechanism 7 and receives the medium S recorded by the recording apparatus 3. The optional unit 5 and the second unit 5 are designated by the same reference numeral. In this embodiment, as illustrated in FIGS. 5 and 6, the optional unit 5 is a relay unit 39 that transports the medium S recorded by the recording apparatus 3 to a post-processing device 37 (FIG. 5) that performs predetermined post-processing, such as stapling, on the recorded medium S. In FIGS. 5 and 6, the symbol F indicates the transportation direction in which the medium S is transported. As illustrated in FIG. 6, the relay unit 39 has an inlet portion 35 that receives the medium S discharged from the recording apparatus 3. The medium S received at the inlet portion 35 is transported in the transport direction F along an internal transportation path 20 to the post-processing device 37. In FIG. 5, the relay unit 39 is not illustrated. The relay unit 39 may have a paper jam if the medium is transported at an angle. To avoid such a problem, it is important to receive the medium at the correct position and in the correct insertion direction. This requires high positioning accuracy of the relay unit 39.

Positions of Positioning Guide and Positioner

Figure 7:
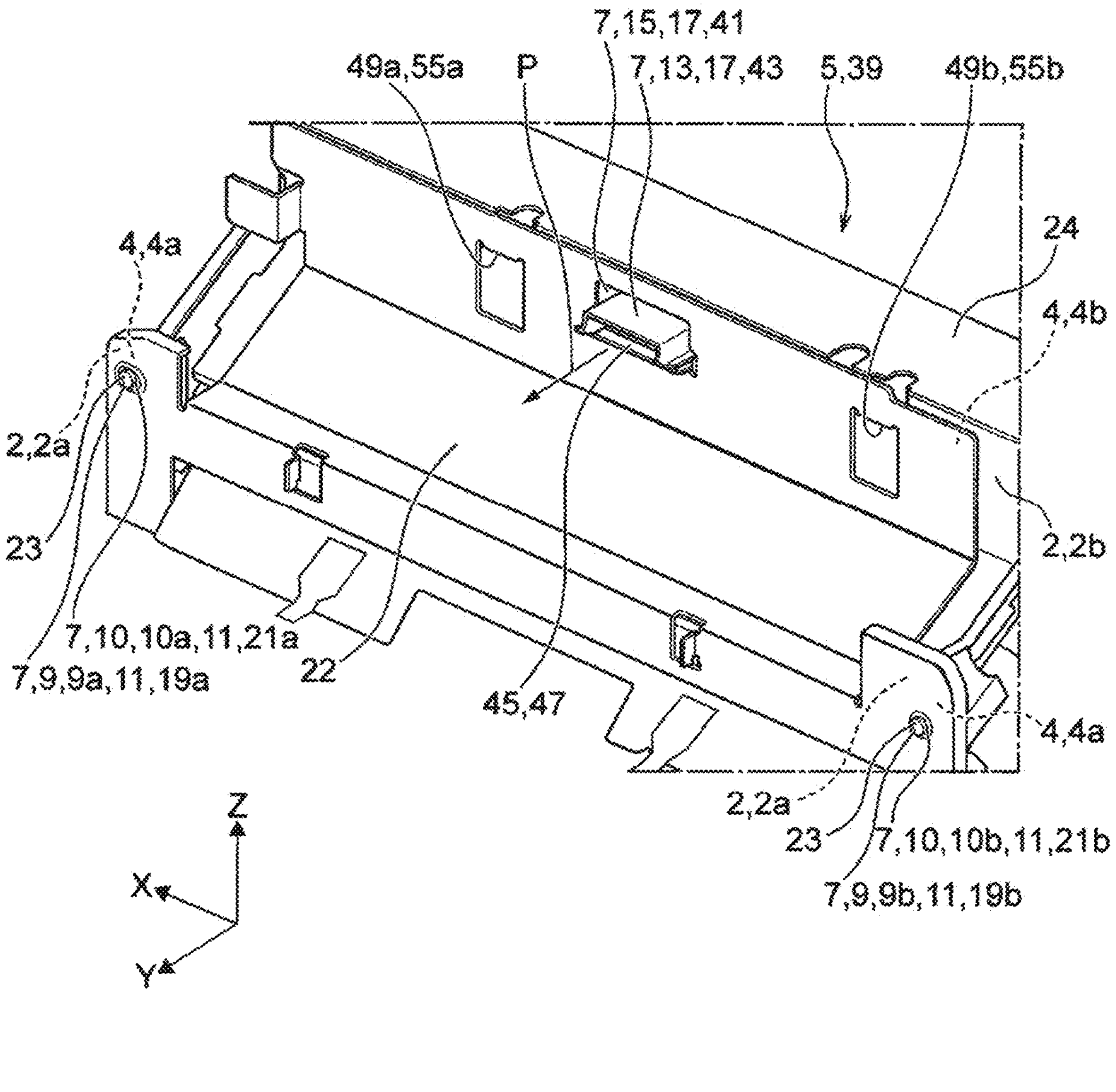
FIG. 7 is a perspective view illustrating main components of Second Embodiment.
Figure 8:
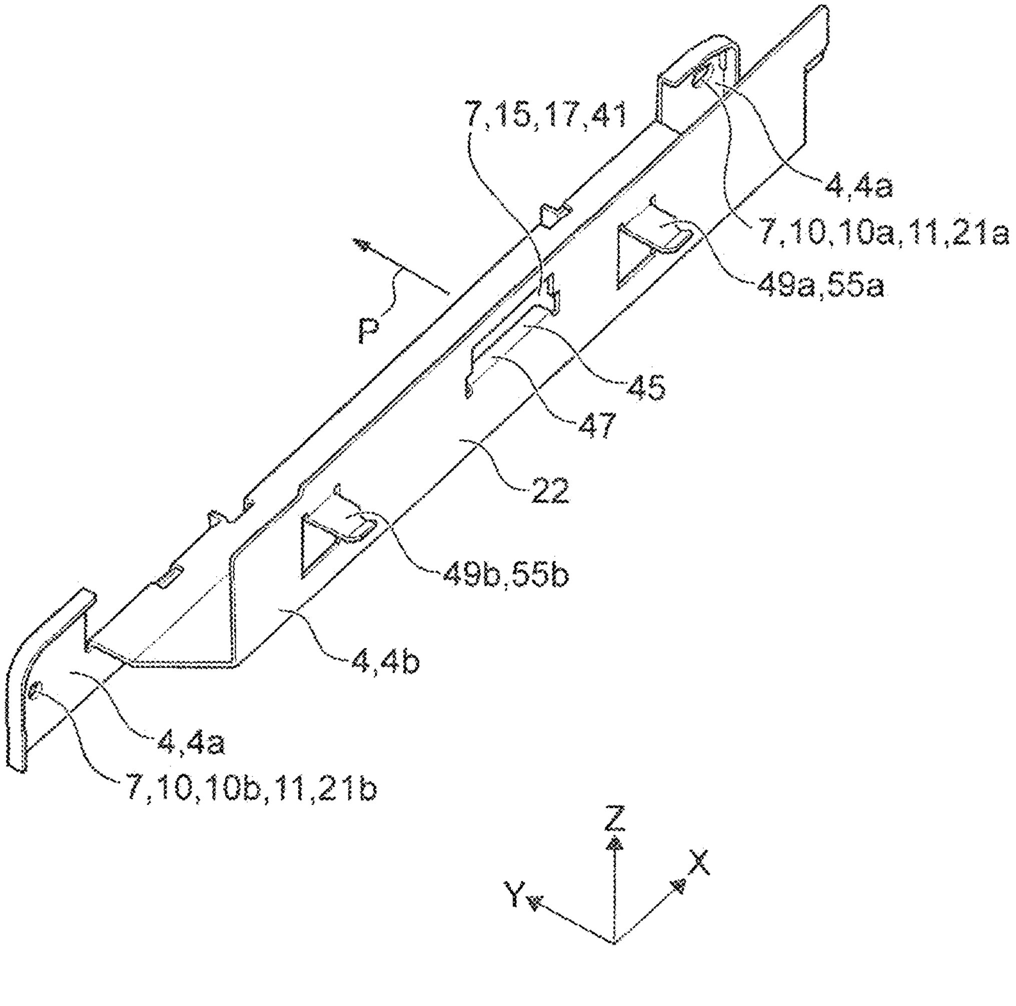
FIG. 8 is a perspective view illustrating main components of a first unit of Second Embodiment.

As illustrated in FIG. 6, unlike First Embodiment, the joint surface 2 of the relay unit 39, which has the positioner 11 and the positioning guide 17, includes a first joint surface 2*a* and a second joint surface 2*b* located away from each other in the insertion direction P. The second joint surface 2*a*, which is located "forward", has the first insertion portion 9 of the positioner 11. The second joint surface 2*b*, which is located "backward", has the second insertion portion 13 of the positioning guide 17. As illustrated in FIGS. 7 and 8, unlike First Embodiment, the joint surface 4 of the recording apparatus 3, which has the positioner 11 and the positioning guide 17, also includes a first joint surface 4*a* and a second joint surface 4*b* located away from each other in the insertion direction P. The first joint surface 4*a*, which is located "forward", has the first inserted portion 10 of the positioner 11. The second joint surface 4*b*, which is located "backward", has the second inserted portion 15 of the positioning guide 17. On the contrary to the above, the second joint surface 2*a* may have the first inserted portion 10 of the positioner 11, the second joint surface 2*b* may have the second inserted portion 15 of the positioning guide 17, the first joint surface 4*a* may have the first insertion portion 9 of the positioner 11, and the second joint surface 4*b* may have the second insertion portion 13 of the positioning guide 17. Alternatively, as in First Embodiment, the same joint surface may have the first inserted portion 10 and the second inserted portion 15, and the same joint surface may have the first insertion portion 9 and the second insertion portion 13.

As can be understood from the above description, the positioning guide 17 is located upstream of the positioner 11 in the insertion direction P. As illustrated in FIGS. 6 and 7, the positioning guide 17 is located above the positioner 11. Specifically, the positioning guide 17 is located between and above the two first insertion portions 9*a* and 9*b*. In FIG. 7, portions of the recording apparatus 3 except for the joint surface 4 (4*a*, 4*b*) having the second inserted portion 15 are not illustrated for ease of explanation.

In this embodiment, as illustrated in FIG. 7, the positioners 11 are located with the inlet portion 35 being therebetween in the width direction (X-axis direction) of the medium S to be transported. Specifically, the two first insertion portions 9*a* and 9*b* of the positioner 11 are located at respective ends of the relay unit 39 in the width direction (X-axis direction). In FIG. 7, the inlet portion 35 is out of sight and not illustrated, but the inlet portion 35 illustrated in FIG. 6 is located between the first insertion portions 9*a* and 9*b* in FIG. 7. The two first inserted portions 10*a* and 10*b* of the positioner 11 are included in the joint surface 4 of the recording apparatus 3 at positions corresponding to the two first insertion portions 9*a* and 9*b*. As illustrated in FIG. 6, the positioning guide 17 is located above the inlet portion 35.

Positioning Guide

In this embodiment, the positioning guide 17 includes a first hole 41, which is the second inserted portion 15, in the recording apparatus 3 and a first projection 43, which is the second insertion portion 13 to be inserted into the first hole 41 in the relay unit 39, which is the optional unit 5. The movement of the relay unit 39 in the vertical direction (Z-axis direction) is limited when the first projection 43 is inserted into the first hole 41. As illustrated in FIG. 8, the joint surface 4 (4*a*, 4*b*) of the recording apparatus 3 is formed of a sheet metal 22 that was bent and cut. The first hole 41, which is the second inserted portion 15, is a cutout in the sheet metal 22. The holes 21*a* and 21*b*, which are the first inserted portions 10*a* and 10*b* of the positioner 11, are through holes in the sheet metal 22 as illustrated. In this embodiment, the hole 21*a* is long in the X-axis direction.

Furthermore, the first hole 41 has a first flat portion 45. The first flat portion 45 is a portion of the sheet metal 22 cut and bent up into the illustrated shape to protrude in the insertion direction P. The first flat portion 45 has a flat surface 47 extending in the insertion direction P. The flat surface 47 faces the lower surface of the first projection 43 inserted into the first hole 41. The first flat portion 45 limits the downward movement of the first projection 43 inserted into the first hole 41.

Figure 9:
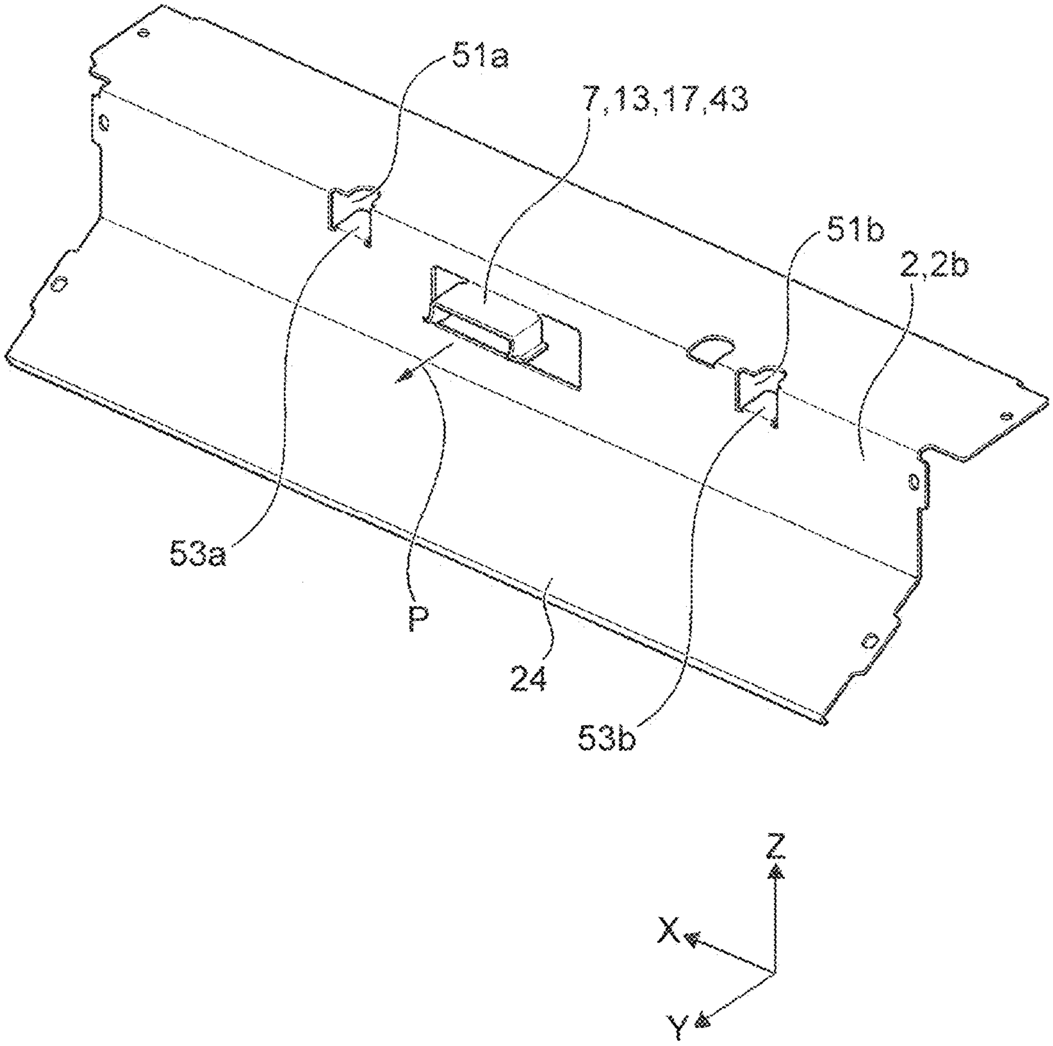
FIG. 9 is a perspective view illustrating main components of a second unit of Second Embodiment.

In this embodiment, as illustrated in FIG. 9, the second joint surface 2*b*, which is a portion of the joint surface 2 of the relay unit 39, is formed of the sheet metal 24 that was bent and cut. The first projection 43, which is the second insertion portion 13, is a portion of the sheet metal 24 cut and bent up. Specifically, the first projection 43 is a portion of the sheet metal 24 cut and bent up into the illustrated shape to protrude in the insertion direction P. In FIG. 9, the relay unit 39 is not illustrated except for the second joint surface 2*b*. In addition, in this embodiment, the second joint surface 2*a*, which has the first insertion portions 9*a* and 9*b*, is also included in a different member than the sheet metal 24 and thus is not illustrated.

In addition, this embodiment includes the second projections 49*a* and 49*b*, which are located with the first hole 41 at the middle being therebetween in the width direction (X-axis direction) of the medium S (FIG. 8), and the second holes 51*a* and 51*b* that receive the second projections 49*a* and 49*b* (FIG. 9). The second projections 49*a* and 49*b* are portions of the sheet metal 22, which has the first flat portion 45, cut and bent up to protrude in the direction (−Y direction) opposite the insertion direction P. The second holes 51*a* and 51*b* are portions of the sheet metal 24, which has the second insertion portion 13, cut and bent up to protrude in the direction (−Y direction) opposite the insertion direction P. The rotation of the optional unit 5 about the second insertion portion 13 is limited when the second projections 49*a* and 49*b* are inserted into the second holes 51*a* and 51*b*.

Figure 10:
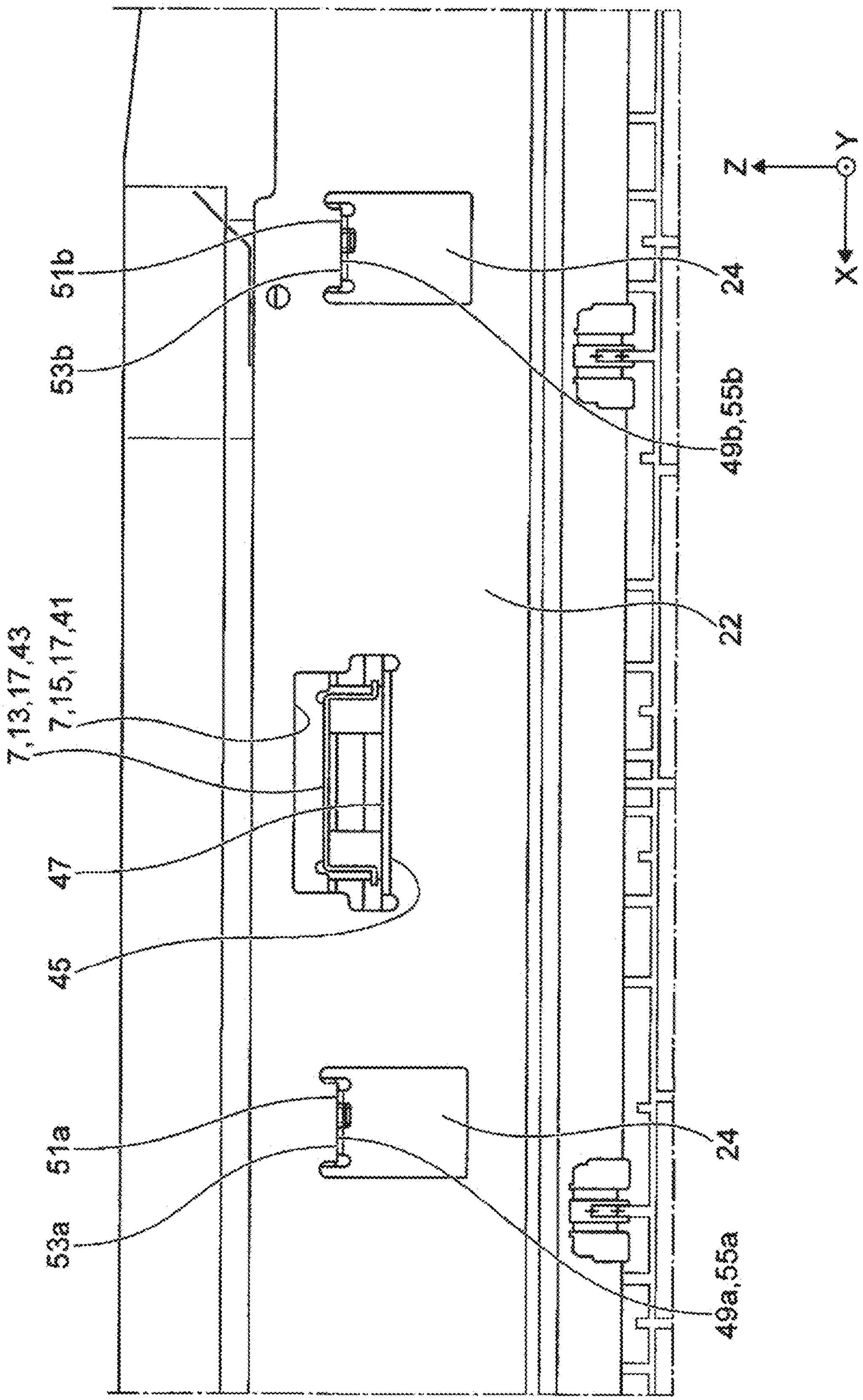
FIG. 10 is a view illustrating the main components of Second Embodiment viewed in an insertion direction.

In this embodiment, the second projections 49*a* and 49*b* are the additional second insertion portions 13 of the positioning guide 17, and the second holes 51*a* and 51*b* are the additional second inserted portions 15 of the positioning guide 17. As illustrated in FIG. 10, the upward movement of the optional unit 5 is limited when the second projections 49*a* and 49*b* are inserted into the second holes 51*a* and 51*b*.

Figure 11:
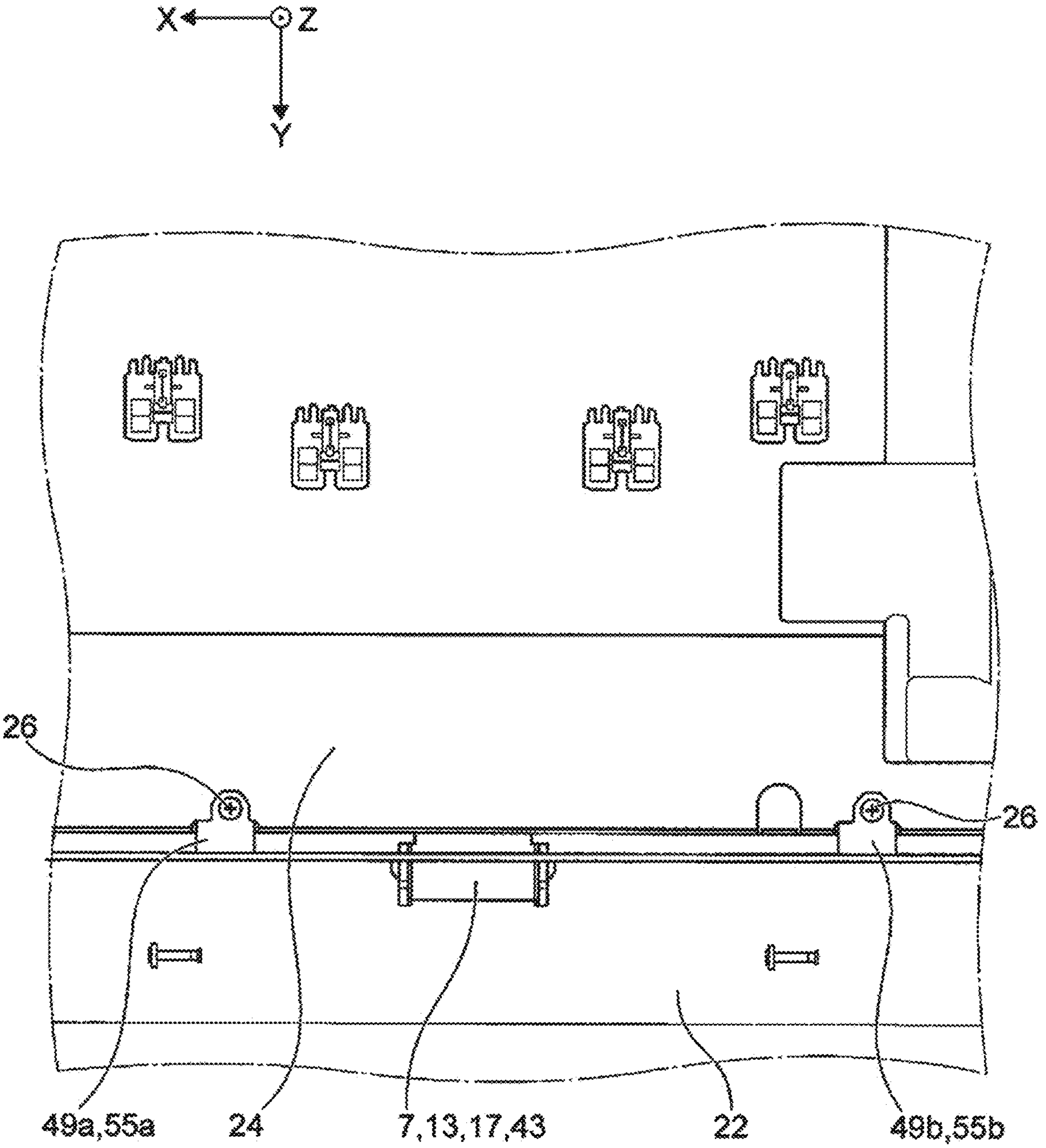
FIG. 11 is a top view illustrating the main components of Second Embodiment.

In this embodiment, the optional unit 5 has the second holes 51*a* and 51*b* having the second flat portions 53*a* and 53*b*, respectively (FIG. 9), and the second projections 49*a* and 49*b* having the plate-like third flat portions 55*a* and 55*b*, respectively (FIG. 8). The second flat portions 53*a* and 53*b* are portions of the sheet metal 24, which has the second insertion portion 13, cut and bent up to protrude in the direction (−Y direction) opposite the insertion direction P. The third flat portions 55*a* and 55*b* are portions of the sheet metal 22 having the first flat portion 45 cut and bent up to protrude in the direction (−Y direction) opposite the insertion direction P. As illustrated in FIGS. 10 and 11, when the third flat portions 55*a* and 55*b* are inserted into the second holes 51*a* and 51*b*, the second flat portions 53*a* and 53*b* overlap the third flat portions 55*a* and 55*b* from below. In other words, the second flat portions 53*a* and 53*b* are positioned under the third flat portions 55*a* and 55*b* and overlap the third flat portions 55*a* and 55*b* in top view. In this embodiment, the second flat portions 53*a* and 53*b* are in contact with the lower surfaces of the third flat portions 55*a* and 55*b*. In this embodiment, as illustrated in FIGS. 11 and 12, the second flat portions 53*a* and 53*b* and the third flat portions 55*a* and 55*b* are fastened with screws 26 in the above-described overlapping state.

Figure 12:
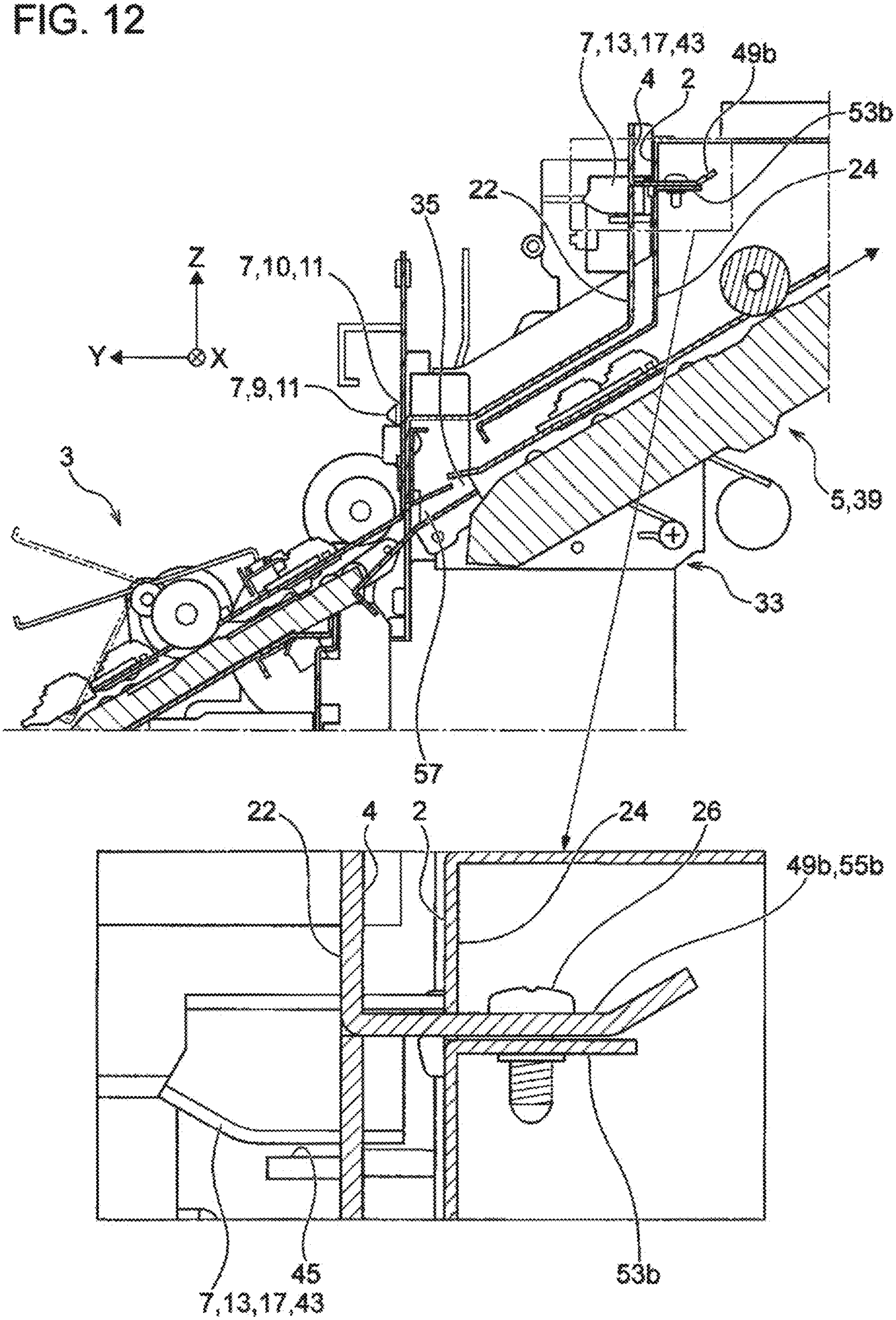
FIG. 12 includes a side cross-sectional view illustrating main components of Second Embodiment and a partial magnified view of the main components.

In this embodiment, as illustrated in FIG. 12, which is a partially magnified view, the recording apparatus 3 includes a discharge portion 57 that discharges the medium S. The discharge portion 57 is configured to be inserted into the inlet portion 35. In this embodiment, the first inserted portion 10 is located on the same plane as the discharge portion 57. In other words, as illustrated in FIG. 12, on the same X-Z plane, the first inserted portion 10 is located at an upper position, and the discharge portion 57 is located at a lower position. The phrase "located on the same plane" referred to herein should not be interpreted to be "the same" in a strict sense of the word and means that the first inserted portion 10 and the discharge portion 57 are located close to one reference plane.

Figure 13:
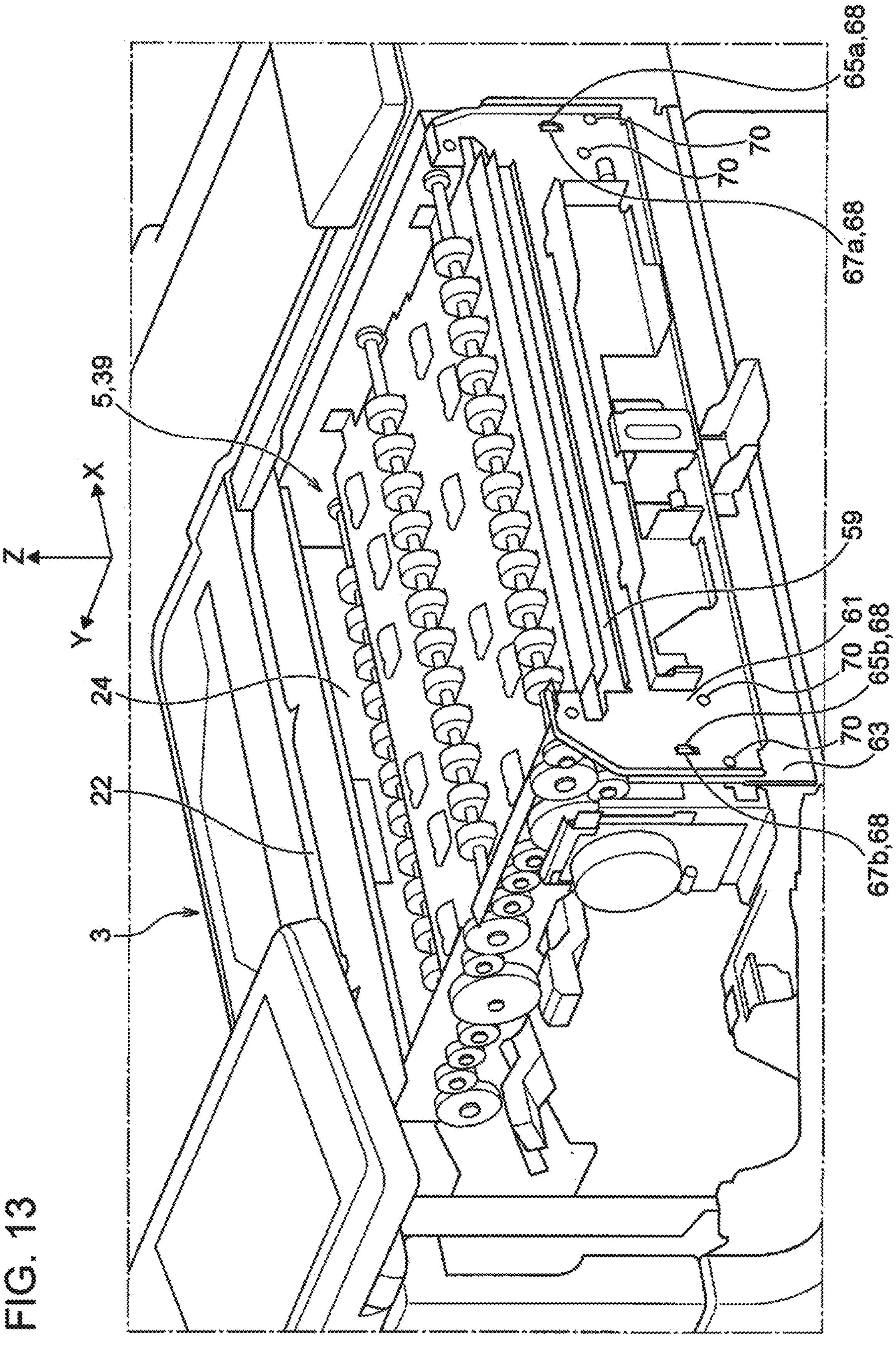
FIG. 13 is a perspective view illustrating main components of Second Embodiment.

In this embodiment, as illustrated in FIGS. 6 and 13, the relay unit 39 further includes a rear portion 61 that has a delivery portion 59 from which the medium S is delivered to a post-processing device 37. The recording apparatus 3 includes a restriction portion 63 that limits the movement of the relay unit 37 in the insertion direction P. The movement of the rear portion 61 in the insertion direction P is limited by the restriction portion 63. In this embodiment, as illustrated in FIG. 13, the rear portion 61 is in contact with the outer surface of restriction portion 63. In other words, the rear portion 61 is located rearwardly from the restriction portion 63 in the insertion direction P and is in contact with the restriction portion 63.

In this embodiment, the rear portion 61 of the relay unit 37 is positioned by a rear positioner 68 to be in contact with the restriction portion 63 of the recording apparatus 3. The rear positioner 68 positions the rear portion 61 of the relay unit 37 relative to the recording apparatus 3 when two projections 65*a* and 65*b* of the restriction portion 63 are inserted into holes 67*a* and 67*b* in the rear portion 61. The rear portion 61 is fastened with screws 70, for example, while being correctly positioned by the rear positioner 68.

Explanation of Effects of Second Embodiment (1) According to this embodiment, when the second unit 5 is the optional unit 5 that is coupled to the recording apparatus 3 by the positioning mechanism 7 at the inner output portion 33 of the recording apparatus 3 to receive the medium S recorded by the recording apparatus 3, the positioner 11 is positioned at a less visible position to the user. In particular, when the positioners 11 are located with the inlet portion 35 being therebetween in the width direction of the medium S to be transported, one of the positioners 11 is located at the back of the optional unit. This makes it difficult for a person to work while seeing both the positioners 11 at the same time, and the positioners 11 is less visible. Thus, the alignment of the positioner 11 is more difficult. However, according to this embodiment, as described in First Embodiment, the alignment of the positioner 11 is completed when the first stage of the alignment by the positioning guide 17 is completed, and thus the first insertion portion 9 can enter the first inserted portion 10 with less risk of collision. Furthermore, the positioning guide 17 is located above the inlet portion 35, and thus the visibility of the positioning guide 17, which performs the first stage of alignment, increases. The alignment of the positioning guide 17 is easier by a level corresponding to the increased visibility. Thus, the recording apparatus 3 and the optional unit 5 are coupled to each other in a correctly positioned state.

(2) According to this embodiment, the positioning guide 17 is located above the positioner 11, and thus the positioning guide 17 is more visible during alignment, resulting in easier alignment of the positioning guide 17.

(3) According to this embodiment, the positioning guide 17 is located upstream of the positioner 11 in the insertion direction P, and thus the positioning guide 17 is more visible during alignment, resulting in easier alignment of the positioning guide 17.

(4) In the processing system 1 in which the discharge portion 57 of the recording apparatus 3 is inserted into the inlet portion 35 of the optional unit 5, if the discharge portion 57 and the inlet portion 35 are moved close to each other with the alignment being insufficient, there is a risk of damage to the positioning mechanism 7 as well as a risk of damage to the discharge portion 57 and the inlet portion 35 caused by collision between them. It can be said that the present disclosure is greatly beneficial to the processing system 1 having such a structure.

(5) Furthermore, in the processing system 1 in which the inlet portion 35 of the optional unit 5 receives the medium S discharged from the discharge portion 57 of the recording apparatus 3, the relative positions of the discharge portion 57 and the inlet portion 35 particularly require a high level of positioning accuracy. According to this embodiment, the first inserted portion 10 is located on the same plane as the discharge portion 57. This enables the positioner 11 to be positioned close to the discharge portion 57, and thus the requirement can be readily satisfied.

(6) Furthermore, according to this embodiment, the vertical movement of the optional unit 5 is limited when the first projection 43, which constitutes the positioning guide 17, is inserted into the first hole 41, which also constitutes the positioning guide 17. In other words, when the first projection 43 is inserted into the first hole 41, the movable range of the first projection 43 is limited by the upper end and the lower end of the hole. Thus, the formation of the vertical clearance region 27 (First Embodiment) is easy.

(7) Furthermore, according to this embodiment, the downward movement of the first projection 43 inserted into the first hole 41 is limited by the first flat portion 45, resulting in easier alignment of the positioning guide 17. Furthermore, the first projection 43 inserted into the first hole 41 is guided in the insertion direction by the first flat portion 45, also resulting in easier alignment of the positioning guide 17.

(8) Furthermore, according to this embodiment, the rotation of the optional unit 5 about the second insertion portion 13 is limited when the second projections 49*a* and 49*b* are inserted into the second holes 51*a* and 51*b*, respectively. This enables the alignment of the positioning guide 17 to be performed in a stable posture, resulting in easier alignment of the positioning guide 17.

(9) Furthermore, according to this embodiment, the upward movement of the optional unit 5 is limited when the second projections 49*a* and 49*b*, which constitute the additional second insertion portions 13, are inserted into the second holes 51*a* and 51*b*, which constitute the additional second inserted portions 15, resulting in easier alignment of the positioning guide 17.

(10) Furthermore, according to this embodiment, when the third flat portions 55*a* and 55*b* are inserted into the second holes 51*a* and 51*b*, respectively, the second flat portions 53*a* and 53*b* overlap the third flat portions 55*a* and 55*b* from below. This limits the upward movement and enables the alignment of the positioning guide 17 to be performed in a stable posture, resulting in easier alignment of the positioning guide 17. Furthermore, since the second flat portions 53*a* and 53*b* overlap the third flat portions 55*a* and 55*b* from below, the second flat portions 53*a* and 53*b* can be fixed to the third flat portions 55*a* and 55*b* with fasteners such as screws. This fixing operation is easy, since the positioning guide 17 is located above the inlet portion 35.

(11) Furthermore, according to this embodiment, the relay unit 39, which transports the medium S to the post-processing device 37 that performs predetermined post-processing on the medium S recorded by the recording apparatus 3, can have the same effect.

(12) Furthermore, according to this embodiment, when the relay unit 39 positioned at the inner output portion 33 of the recording apparatus 3 is moved in the insertion direction P to be positioned by the positioning mechanism 7 for mounting, the movement of the rear portion 61 in the insertion direction P is limited by the restriction portion 63. Thus, the mounting operation is easy.

OTHER EMBODIMENTS

The processing system 1 according to the present disclosure basically has the above-described configuration of the above embodiment, but the components may be partially modified or eliminated, for example, without departing from the gist of the present disclosure.

In Second Embodiment, the optional unit 5 is the relay unit 39 but may be an inner finisher. The inner finisher performs alignment after receiving media in the apparatus and thus requires a lower level of positioning accuracy than the relay unit 39. However, the alignment of the media recorded by an ink jet printer may be difficult due to a frictional force between the media. Thus, even when the optional unit 5 is an inner finisher, it is advantageous to increase the positioning accuracy as in the present disclosure.

In Second Embodiment, the second projections 49*a* and 49*b* and the second flat portions 53*a* and 53*b* protrude in the direction opposite the insertion direction P but may protrude in the insertion direction P.

In Second Embodiment, the joint surface 2 and the joint surface 4 may be portions of the relay unit and the recording apparatus or may be separate components that are detachable as necessary.

In Second Embodiment, the scanner 16 illustrated in FIG. 5 may be configured to be detached by being lifted up. This enables the positioning guide 17 to be seen from above during work. In particular, even when the scanner 16 covers the entire upper surface of the inner output portion 33, the lifting up of the scanner 16 enables the positioning guide 17 to be seen during work. At this time, the positioning guide 17, which is the first component to be aligned, is more visible, because the positioning guide 17 is located above the inlet portion 35 and the positioner 11, resulting in easier alignment.

What is claimed is:

1. A processing system comprising:

a first unit configured to perform a first process; and a second unit configured to perform a second process and coupled to the first unit by a positioning mechanism, the positioning mechanism comprising: a positioner including a first insertion portion that is included in one of the first unit and the second unit and a first inserted portion that is included in the other of the first unit and the second unit and to which the first insertion portion is inserted to position the first unit and the second unit; and a positioning guide including a second insertion portion that is included in one of the first unit and the second unit and a second inserted portion that is included in the other of the first unit and the second unit and to which the second insertion portion is inserted to guide the first insertion portion to an insertable position into the first inserted portion, the second insertion portion of the positioning guide protruding further from the first unit or second unit that includes the second insertion portion than the first insertion portion of the positioner protrudes from the first unit or second unit that includes the first insertion portion, such that during a coupling phase of the first unit and the second unit, at least a portion of the second insertion portion is inserted into the second inserted portion before the first insertion portion begins to be inserted into the first inserted portion.

2. The processing system according to claim 1, wherein the positioning guide has a clearance region in which the second insertion portion is movable relative to the second inserted portion in a direction intersecting a direction of the insertion, and the first insertion portion becomes insertable into the first inserted portion when the second insertion portion is positioned in the second inserted portion having the clearance region.

3. The processing system according to claim 2, wherein the clearance region includes a vertical clearance section that defines a vertical movable range and a horizontal clearance section that defines a horizontal movable range.

4. The processing system according to claim 2, wherein the first insertion portion includes a pin protruding in the insertion direction, the first inserted portion includes a hole, the pin has a tapered portion tapered in the insertion direction at a front end, and the tapered portion has a tip in the hole when the second insertion portion is positioned in the clearance region of the second inserted portion.

5. The processing system according to claim 2, wherein the first insertion portion includes a pin protruding in the insertion direction, the first inserted portion includes a hole, the hole has a reverse tapered portion having a diameter that gradually increases in a direction opposite the insertion direction at a hole entrance, and the pin is positioned in a largest diameter portion of the hole when the second insertion portion is positioned in the clearance region of the second inserted portion.

6. The processing system according to claim 1, wherein the first unit is a recording apparatus having an inner output portion to which a recorded medium is discharged, the second unit is an optional unit coupled to the recording apparatus by the positioning mechanism at the inner output portion and having an inlet portion that receives a medium recorded by the recording apparatus, the positioner includes two positioners that are located with the inlet portion being therebetween in a width direction of the medium to be discharged, and the positioning guide is located above the inlet portion.

7. The processing system according to claim 6, wherein the positioning guide is located above the positioner.

8. The processing system according to claim 6, wherein the positioning guide is located upstream of the positioner in the insertion direction.

9. The processing system according to claim 6, wherein the recording apparatus includes a discharge portion configured to discharge a recorded medium, and the discharge portion is inserted into the inlet portion.

10. The processing system according to claim 9, wherein the first inserted portion is located on the same plane as the discharge portion.

11. The processing system according to claim 6, wherein the second inserted portion includes a first hole that is included in one of the recording apparatus and the optional unit, the second insertion portion includes a first projection that is included in one of the recording apparatus and the optional unit and inserted into the first hole, and vertical movement of the optional unit is limited when the first projection is inserted into the first hole.

12. The processing system according to claim 11, wherein the second inserted portion has a first flat portion, the first flat portion has a flat surface extending in the insertion direction and faces a lower surface of the first projection to be inserted, and the first flat portion limits downward movement of the first projection inserted into the first hole.

13. The processing system according to claim 12, further comprising: second projections located with the first hole being therebetween in a width direction of the medium; and second holes to which the second projections are inserted, wherein when the second projections are inserted into the second holes, rotation of the optional unit about the second insertion portions is limited.

14. The processing system according to claim 13, wherein the second projections are additional second insertion portions of the positioning guide, and the second holes are additional second inserted portions of the positioning guide, and when the second projections are inserted into the second holes, upward movement of the optional unit is limited.

15. The processing system according to claim 14, wherein the additional second inserted portions have second flat portions, the second projections are third flat portions having a plate-like shape, and when the third flat portions are inserted into the second holes, the second flat portions overlap the third flat portions from below.

16. The processing system according to claim 6, wherein the optional unit is a relay unit configured to transport the medium recorded by the recording apparatus to a post-processing device configured to perform predetermined post-processing on the recorded medium.

17. The processing system according to claim 16, wherein the relay unit has a rear portion having a delivery portion that delivers the medium to the post-processing device, the recording apparatus includes a restriction portion that limits movement of the relay unit in the insertion direction, and the restriction portion limits the movement of the rear portion in the insertion direction.

18. A relay unit coupled to a recording apparatus by a positioning mechanism at an inner output portion of the recording apparatus and including an inlet portion configured to receive a medium recorded by the recording apparatus, the relay unit being configured to transport the medium to a post-processing device that performs predetermined post-processing on the medium, the positioning mechanism comprising: a positioner including a first insertion portion that is included in one of the recording apparatus and the relay unit and a first inserted portion that is included in the other of the recording apparatus and the relay unit and to which the first insertion portion is inserted to position the recording apparatus and the relay unit; and a positioning guide including a second insertion portion that is included in one of the recording apparatus and the relay unit and a second inserted portion that is included in the other of the recording apparatus and the relay unit and to which the second insertion portion is inserted to guide the first insertion portion to an insertable position into the first inserted portion, the second insertion portion of the positioning guide protruding further from the recording apparatus or the relay unit that includes the second insertion portion than the first insertion portion of the positioner protrudes from the recording apparatus or the relay unit that includes the first insertion portion, such that during a coupling phase of the recording apparatus and the relay unit, at least a portion of the second insertion portion is inserted into the second inserted portion before the first insertion portion begins to be inserted into the first inserted portion.

19. The relay unit according to claim 18, wherein the positioner includes two positioners located with the inlet portion being therebetween in a width direction of a medium to be discharged, and the positioning guide is located above the inlet portion.

20. The relay unit according to claim 19, further comprising two additional positioning guides located with the positioning guide being therebetween in the width direction of the medium, wherein when second projections as second insertion portions of the additional positioning guides are inserted into second holes as second inserted portions of the additional positioning guides, rotation of the optional unit about the positioning guide that is located between the additional positioning guides is limited.

* * * * *